United States Patent
Breuer et al.

(10) Patent No.: US 10,181,901 B2
(45) Date of Patent: Jan. 15, 2019

(54) DETERMINING ENCODING SCHEMES FOR FORMATTING OUTPUT SIGNALS OF LIGHT-BASED COMMUNICATION ENABLED LUMINAIRES

(71) Applicants: Christian Breuer, North Rhine-Westphalia (DE); Anant Aggarwal, Waltham, MA (US); Barry Stout, Beverly, MA (US)

(72) Inventors: Christian Breuer, North Rhine-Westphalia (DE); Anant Aggarwal, Waltham, MA (US); Barry Stout, Beverly, MA (US)

(73) Assignee: OSRAM SYLVANIA Inc., Wilmington, MA (US)

( * ) Notice: Subject to any disclaimer, the term of this patent is extended or adjusted under 35 U.S.C. 154(b) by 0 days.

(21) Appl. No.: 15/592,378

(22) Filed: May 11, 2017

(65) Prior Publication Data

US 2018/0331757 A1    Nov. 15, 2018

(51) Int. Cl.
*H04B 10/116* (2013.01)
*H04B 10/40* (2013.01)
*H04B 10/516* (2013.01)
*H04M 1/737* (2006.01)

(52) U.S. Cl.
CPC .......... *H04B 10/116* (2013.01); *H04B 10/40* (2013.01); *H04B 10/516* (2013.01); *H04M 1/737* (2013.01)

(58) Field of Classification Search
CPC .......................... H04B 10/116; H04B 10/1149
USPC ......................................................... 398/128
See application file for complete search history.

(56) References Cited

U.S. PATENT DOCUMENTS

| 2007/0147843 | A1* | 6/2007 | Fujiwara | H04B 10/1143 |
| | | | | 398/118 |
| 2011/0135317 | A1 | 6/2011 | Chaplin | |
| 2014/0226977 | A1 | 8/2014 | Jovicic et al. | |
| 2016/0164606 | A1* | 6/2016 | Liu | H04B 10/116 |
| | | | | 398/118 |
| 2017/0187850 | A1* | 6/2017 | Fujisaki | H04M 1/0202 |

FOREIGN PATENT DOCUMENTS

KR   2011 0124104 A    11/2011

OTHER PUBLICATIONS

Koch, Bernard, International Search Report and Written Opinion of the International Searching Authority for PCT/US2018/031299, dated Aug. 10, 2018, 10 pages, European Patent Office, Rijswijk, The Netherlands.

* cited by examiner

*Primary Examiner* — Don N Vo
(74) *Attorney, Agent, or Firm* — Yutian Ling

(57) ABSTRACT

Techniques are disclosed for establishing communication between light-based communication (LCom) luminaires within a navigation array of luminaires and mobile computing devices having varying components and processes using an encoding scheme received from passing mobile computing devices. The encoding scheme is a set of rules for encoding and generating a visible-light communication (VLC) signal so that the mobile computing device may recognize VLC signals broadcast by the luminaire. In accordance with some embodiments, the disclosed techniques can be used, for example, to accommodate future computing devices that may incorporate different camera technologies and different processing algorithms to process waveforms in the VLC signals.

19 Claims, 12 Drawing Sheets

DETERMINING ENCODING SCHEMES FOR FORMATTING OUTPUT SIGNALS OF LIGHT-BASED COMMUNICATION ENABLED LUMINAIRES

TECHNICAL FIELD

The present disclosure relates to solid-state lighting (SSL) and more particularly to light-based communication via SSL.

BACKGROUND

Global positioning system (GPS) devices are commonly used to facilitate navigation on Earth. These GPS devices are designed to communicate with orbiting satellites that transmit location and time information. Closer to the Earth's surface, such satellite-based navigation can be supplemented using local area wireless technologies, such as Wi-Fi, which utilize radio frequency (RF) signals to communicate with nearby compatible devices. These types of wireless technologies typically employ wireless access points (Wi-Fi hotspots) to establish network access, and in cases of secured wireless networks, a password or other security credentials normally must be provided in order to gain network access.

Figure 1:
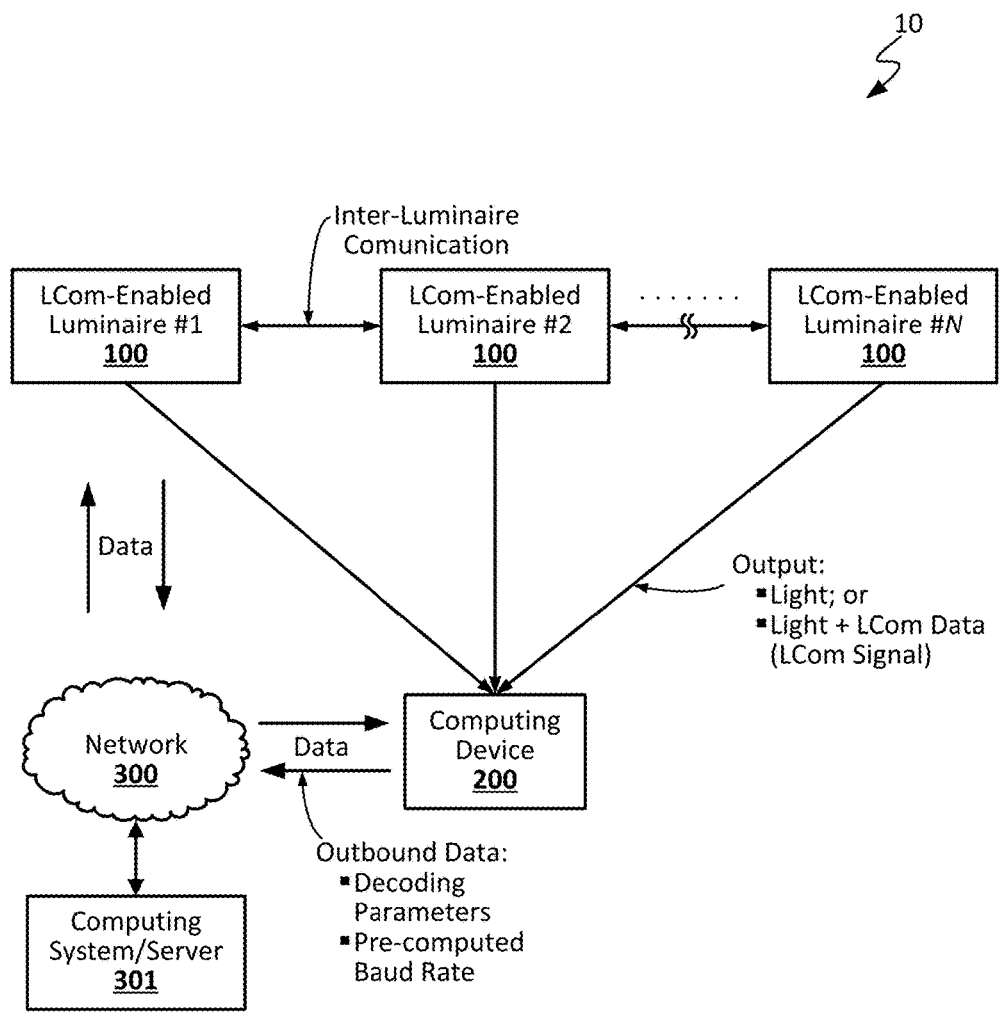
FIG. 1 is a block diagram illustrating an example light-based communication (LCom) system configured in accordance with an embodiment of the present disclosure.

The figures depict various embodiments of the present disclosure for purposes of illustration only. Numerous variations, configurations, and other embodiments will be apparent from the following detailed discussion.

DETAILED DESCRIPTION

Techniques are disclosed for establishing communication between light-based communication (LCom) luminaires within an array of luminaires. Communication is established using an encoding scheme received from passing mobile computing devices that are capable of receiving LCom signals, also referred to herein as visible-light communication (VLC) signals. The encoding scheme may be generally thought of as a set of rules for encoding and generating a VLC signal so that a recipient mobile computing device may recognize VLC signals broadcast by the luminaire. In accordance with some embodiments, the disclosed techniques can be used, for example, to accommodate future mobile computing devices that may incorporate different camera technologies and different processing algorithms to process waveforms in the VLC signals. To this end, the techniques provided herein are agnostic to the various components and processes of a given mobile computing device.

Overview

Light-based communication (LCom) systems for navigation use luminaires of an array of luminaires that are capable of communicating with a mobile computing device of a user through light-based communication. Communication between a luminaire and the mobile computing device may include transmitting luminaire position to the mobile computing device as the user passes by the luminaire. Using the luminaire position, the mobile computing device can direct the user how to proceed through an area that includes the array of luminaires. Mobile computing device technology, however, is continuously evolving. The components, processes, communication protocols, and signal encoding schemes used with today's technology may not be the same as future computing devices. Future computing devices may incorporate different camera technologies, different processing algorithms, and different encoding schemes for facilitating communication between VLC-enabled devices.

Thus, techniques are provided herein to enable individual LCom-enabled luminaires and arrays of LCom-enabled luminaires to effectively adapt to changes in mobile computing device technology, so as to in turn facilitate LCom-based applications (e.g., navigation and targeted in-store marketing) with a wide variety of mobile computing devices. In some embodiments of the present disclosure, a given LCom-enabled methodology is configured to identify a VLC encoding scheme supported by a mobile computing device and to configure a luminaire to transmit signals to the mobile computing device using the identified VLC encoding scheme. In one such example embodiment, a given mobile computing device may broadcast an LCom service request ("service request") to a luminaire of an array. The service request from the mobile computing device may specify a VLC encoding scheme that the mobile computing device is configured to receive and process. As used herein, VLC encoding scheme refers to a set of rules by which a waveform of the LCom signal is generated so that the signal is recognizable and processable by the mobile computing device. This service request may be received by the luminaire, either directly from the mobile computing device via a local communication link or indirectly from a remote server, for instance. The luminaire can then implement the requested VLC encoding scheme, and then commence transmitting the luminaire position. Note that the luminaire position is transmitted using the requested VLC encoding scheme, such that the position information can be recognized by the mobile computing device. Numerous other embodiments and use cases will be appreciated in light of this disclosure.

Prior to discussing details of these methods and systems in FIGS. 7-12, general LCom systems and methods are described in the context of FIGS. 1 to 6B.

System Architecture

FIG. 1 is a block diagram illustrating an example light-based communication (LCom) system 10 configured in accordance with an embodiment of the present disclosure. As can be seen, system 10 may include one or more LCom-enabled luminaires 100 configured for light-based communicative coupling with a mobile computing device 200 via LCom signal(s). As discussed herein, such LCom may be provided, in accordance with some embodiments, via visible light-based signals. In some cases, LCom may be provided in one direction; for instance, LCom data may be passed from a given LCom-enabled luminaire 100 (e.g., the transmitter) to a mobile computing device 200 (e.g., the receiver), or from a mobile computing device 200 (e.g., the transmitter) to a given LCom-enabled luminaire 100 (e.g., the receiver). In some other cases, LCom may be provided in a bi-directional fashion between a given LCom-enabled luminaire 100 and a mobile computing device 200, where both act as a transceiver device capable of transmitting and receiving.

In some cases in which system 10 includes a plurality of LCom-enabled luminaires 100, all (or some sub-set thereof) may be configured for communicative coupling with one another so as to provide inter-luminaire communication. In one such scenario, for instance, the inter-luminaire communication can be used to notify other luminaries 100 that a given mobile computing device 200 is currently present, as well as the position information for that particular device 100. Such inter-luminaire communication is not needed, however, as will be appreciated in light of this disclosure.

As can be further seen in this example embodiment, system 10 allows for communicative coupling with a network 300 and one or more servers or other computer systems 301. Communicative coupling may be provided, for example, between network 300 and mobile computing device 200 and/or one or more LCom-enabled luminaires 100, as desired. The network 300 may be a wireless local area network, a wired local network, or a combination of local wired and wireless networks, and may further include access to a wide area network such as the Internet or a campus-wide network. In short, network 300 can be any communications network.

The computer systems 301 may be any suitable computing system capable of communicating over a network 300, such as a cloud-based server computer, and may be programmed or otherwise configured to provide an LCom related service, according to some embodiments. For example, an LCom related service might be that the computer system 301 is configured to provide storage of mobile computing device position information or encoding schemes for generating VLC signals, for example. Numerous other such configurations will be apparent in light of this disclosure.

Figure 2A:
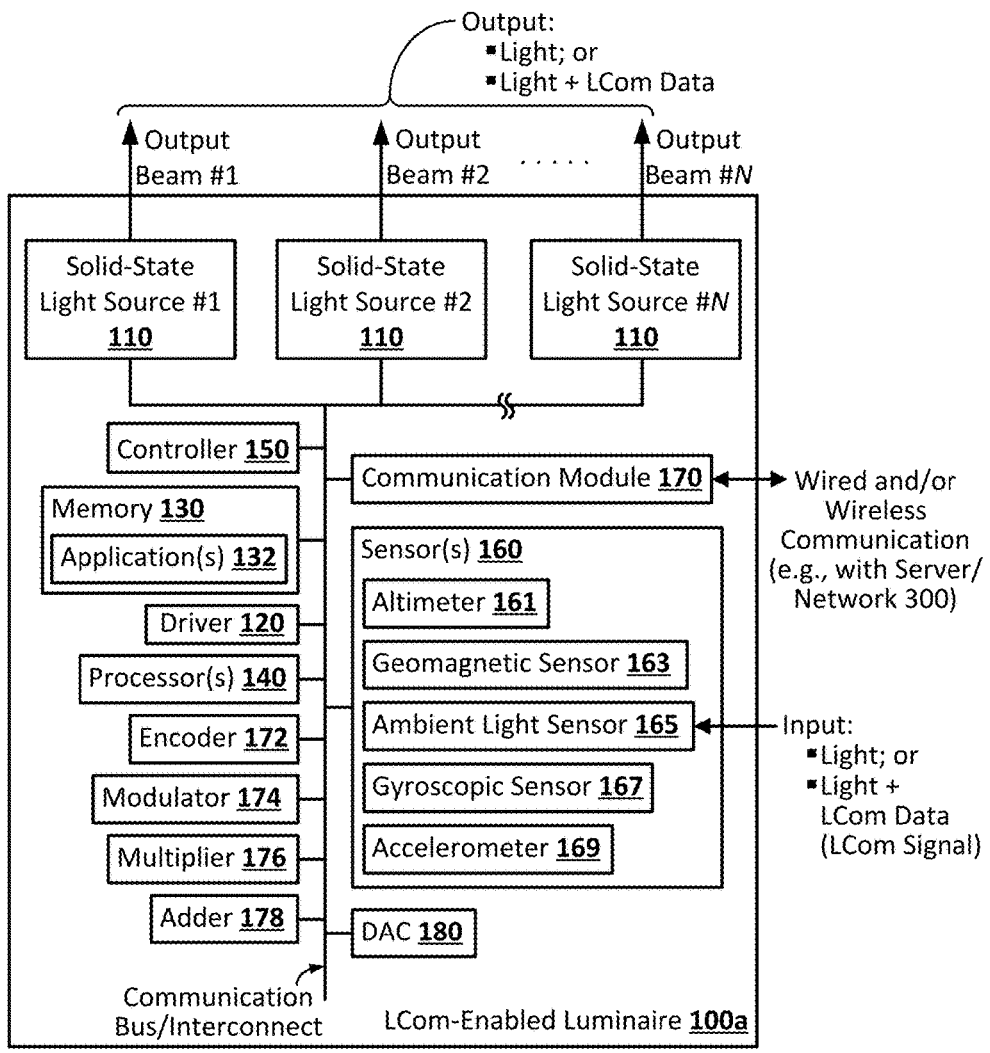
FIG. 2A is a block diagram illustrating an LCom-enabled luminaire configured in accordance with an embodiment of the present disclosure.
Figure 2B:
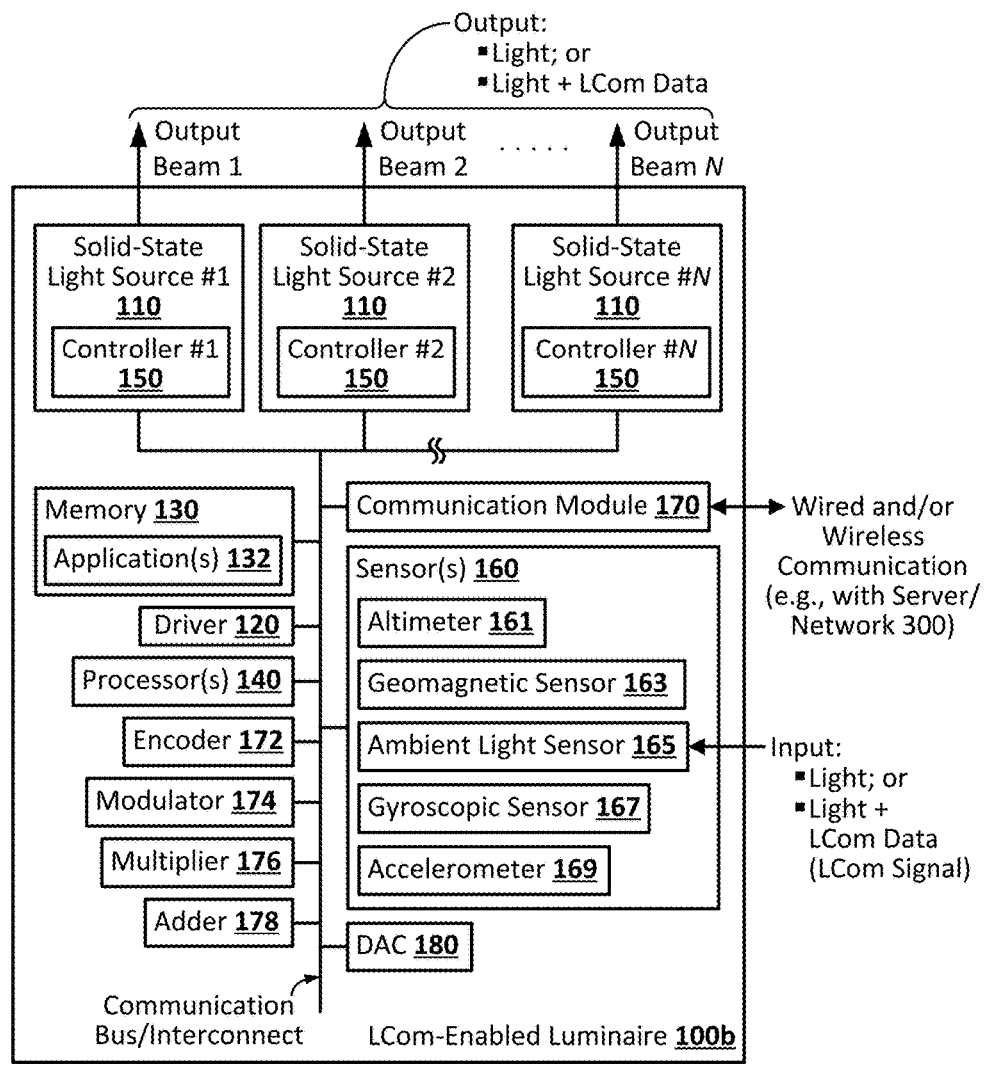
FIG. 2B is a block diagram illustrating an LCom-enabled luminaire configured in accordance with another embodiment of the present disclosure.

FIG. 2A is a block diagram illustrating an LCom-enabled luminaire 100a configured in accordance with an embodiment of the present disclosure. FIG. 2B is a block diagram illustrating an LCom-enabled luminaire 100b configured in accordance with another embodiment of the present disclosure. As can be seen, a difference between luminaire 100a and luminaire 100b is with respect to the location of controller 150. For consistency and ease of understanding of the present disclosure, LCom-enabled luminaires 100a and 100b hereinafter may be collectively referred to generally as an LCom-enabled luminaire 100, except where separately referenced. Further note that while various modules are shown as distinct modules for purposes of illustration, any number of the modules may be integrated with one or more other modules. For instance, the controller 150 may be integrated with the driver 120. Similarly, the processor(s) 140 and memory 130 may be integrated within the controller 150. Numerous other configurations can be used.

As can be seen, a given LCom-enabled luminaire 100 may include one or more solid-state light sources 110, in accordance with some embodiments. The quantity, density, and arrangement of solid-state light sources 110 utilized in a given LCom-enabled luminaire 100 may be customized, as desired for a given target application or end-use. A given solid-state light source 110 may include one or more solid-state emitters, which may be any of a wide range of semiconductor light source devices, such as, for example, a light-emitting diode (LED), an organic light-emitting diode (OLED), a polymer light-emitting diode (PLED), or a combination of any of these. A given solid-state emitter may be configured to emit electromagnetic radiation, for example, from the visible spectral band and/or other portions of the electromagnetic spectrum not limited to the infrared (IR) spectral band and/or the ultraviolet (UV) spectral band, as desired for a given target application or end-use. In some embodiments, a given solid-state emitter may be configured for emissions of a single correlated color temperature (CCT) (e.g., a white light-emitting semiconductor light source). In other embodiments, a given solid-state emitter may be configured for color-tunable emissions. For instance, in some cases, a given solid-state emitter may be a multi-color (e.g., bi-color, tri-color, etc.) semiconductor light source configured for a combination of emissions, such as: (1) red-green-blue (RGB); (2) red-green-blue-yellow (RGBY); (3) red-green-blue-white (RGBW); (4) dual-white; and/or (5) a combination of any one or more thereof. In some cases, a given solid-state emitter may be configured as a high-brightness light source. In some embodiments, a given solid-state emitter may be provided with a combination of any one or more of the aforementioned example emissions capabilities. In any case, a given solid-state emitter can be packaged or non-packaged, as desired, and in some cases may be populated on a printed circuit board (PCB) or other suitable intermediate/substrate. In some cases, power and/or control connections for a given solid-state emitter may be routed from a given PCB to a driver 120 (discussed in turn below) and/or other devices/componentry, as desired. Other suitable configurations for the one or more solid-state emitters of a given solid-state light source 110 will depend on a given application and will be apparent in light of this disclosure.

A given solid-state light source 110 also may include one or more optics optically coupled with its one or more solid-state emitters. In accordance with some embodiments, the optic(s) of a given solid-state light source 110 may be configured to transmit the one or more wavelengths of interest of the light (e.g., visible, UV, IR, etc.) emitted by solid-state emitter(s) optically coupled therewith. To that end, the optic(s) may include an optical structure (e.g., a window, lens, dome, etc.) formed from any of a wide range of optical materials, such as, for example: (1) a polymer, such as poly(methyl methacrylate) (PMMA) or polycarbonate; (2) a ceramic, such as sapphire ($Al_2O_3$) or yttrium aluminum garnet (YAG); (3) a glass; and/or (4) a combination of any one or more thereof. In some cases, the optic(s) of a given solid-state light source 110 may be formed from a single (e.g., monolithic) piece of optical material to provide a single, continuous optical structure. In some other cases, the optic(s) of a given solid-state light source 110 may be formed from multiple pieces of optical material to provide a multi-piece optical structure. In some cases, the optic(s) of a given solid-state light source 110 may include optical features, such as, for example: (1) an anti-reflective (AR) coating; (2) a reflector; (3) a diffuser; (4) a polarizer; (5) a brightness enhancer; (6) a phosphor material (e.g., which converts light received thereby to light of a different wavelength); and/or (7) a combination of any one or more thereof. In some embodiments, the optic(s) of a given solid-state light source 110 may be configured, for example, to focus and/or collimate light transmitted there through. Other suitable types, optical transmission characteristics, and configurations for the optic(s) of a given solid-state light source 110 will depend on a given application and will be apparent in light of this disclosure.

In accordance with some embodiments, the one or more solid-state light sources 110 of a given LCom-enabled luminaire 100 may be electronically coupled with a driver 120. In some cases, driver 120 may be an electronic driver (e.g., single-channel; multi-channel) configured, for example, for use in controlling one or more solid-state emitters of a given solid-state light source 110. For instance, in some embodiments, driver 120 may be configured to control the on/off state, dimming level, color of emissions, correlated color temperature (CCT), and/or color saturation of a given solid-state emitter (or grouping of emitters). To such ends, driver 120 may utilize any of a wide range of driving techniques, including, for example: (1) a pulse-width modulation (PWM) dimming protocol; (2) a current dimming protocol; (3) a triode for alternating current (TRIAC) dimming protocol; (4) a constant current reduction (CCR) dimming protocol; (5) a pulse-frequency modulation (PFM) dimming protocol; (6) a pulse-code modulation (PCM) dimming protocol; (7) a line voltage (mains) dimming protocol (e.g., dimmer is connected before input of driver 120 to adjust AC voltage to driver 120); and/or (8) a combination of any one or more thereof. Other suitable configurations for driver 120 and lighting control/driving techniques will depend on a given application and will be apparent in light of this disclosure.

As will be appreciated in light of this disclosure, a given solid-state light source 110 also may include or otherwise be operatively coupled with other circuitry/componentry, for example, which may be used in solid-state lighting. For instance, a given solid-state light source 110 (and/or host LCom-enabled luminaire 100) may be configured to host or otherwise be operatively coupled with any of a wide range of electronic components, such as: (1) power conversion circuitry (e.g., electrical ballast circuitry to convert an AC signal into a DC signal at a desired current and voltage to power a given solid-state light source 110); (2) constant current/voltage driver componentry; (3) transmitter and/or receiver (e.g., transceiver) componentry; and/or (4) local processing componentry. When included, such componentry may be mounted, for example, on one or more driver 120 boards, in accordance with some embodiments.

As can be further seen from FIGS. 2A-2B, a given LCom-enabled luminaire 100 may include memory 130 and one or more processors 140. Memory 130 can be of any suitable type (e.g., RAM and/or ROM, or other suitable memory) and size, and in some cases may be implemented with volatile memory, non-volatile memory, or a combination thereof. A given processor 140 may be configured as typically done, and in some embodiments may be configured, for example, to perform operations associated with a given host LCom-enabled luminaire 100 and one or more of the applications 132 thereof (e.g., within memory 130 or elsewhere). In some cases, memory 130 may be configured to be utilized, for example, for processor workspace (e.g., for one or more processors 140) and/or to store media, programs, applications, and/or content on a host LCom-enabled luminaire 100 on a temporary or permanent basis. In one example embodiment, the memory 130 stores an encoding scheme (whether or not received by the mobile computing device) for determining a waveform of VLC signals. In some cases, the encoding schemes may be indexed using one or more look-up tables (LUT) stored in the memory 130. Similarly, the memory 130 may also include a LUT or other memory facility that indexes baud rates by computing device type. Table 1 shows an example look-up table according to one such embodiment. Assume that each of A through F represents a transmission baud rate which can be utilized by luminaires 100. Thus, in some cases, a given processor 140 can identify the baud rate at which the luminary 100 should transmit based on received decoding parameters (these parameters may be provided through network 300, for example, whether those parameters be high level information such as make and model of the subject mobile computing device 200 or lower level information about that device 200 such as its sensing capability (e.g., camera imaging speed and resolution)).

TABLE 1

| Baud Rates LUT | | | | | | |
|---|---|---|---|---|---|---|
| Make (↓) Model (→) | 5S | 6S | Galaxy S6 | Galaxy S5 | Moto X | Moto G |
| Apple Inc | A | B | | | | |
| Samsung | | | C | D | | |
| Motorola | | | | | E | F |

The one or more applications 132 stored in memory 130 can be accessed and executed, for example, by the one or more processors 140 of a given LCom-enabled luminaire 100. In accordance with some embodiments, a given application or module 132 can be implemented in any suitable standard and/or custom/proprietary programming language, such as, for example: (1) C; (2) C++; (3) objective C; (4) JavaScript; and/or (5) any other suitable custom or proprietary instruction sets. In a more general sense, the applications or modules 132 can be instructions encoded on any suitable non-transitory machine-readable medium that, when executed by one or more processors 140, carries out functionality of a given LCom-enabled luminaire 100, in part or in whole. In one example embodiment, at least one of these modules 132 is configured to execute a routine for determining an encoding scheme, based on one or more look-up tables that index various encoding schemes and an encoding scheme identifier transmitted from the mobile computing device 200. In any case, the luminaire 100 can determine an encoding scheme and generate a VLC signal waveform using the encoding scheme information from passing mobile computing devices 200.

In accordance with some embodiments, the one or more solid-state light sources 110 of a given LCom-enabled luminaire 100 can be electronically controlled, for example, to output light and/or light encoded with LCom data (e.g., an LCom signal). To that end, a given LCom-enabled luminaire 100 may include or otherwise be communicatively coupled with one or more controllers 150, for example Cypress programmable system-on-chip (PSoC). A Cypress PSoC may provide versatility for changing certain portions of the code/functionality related to generating VLC signals, for example, the encoding scheme. In some such example embodiments, such as that illustrated in FIG. 2A, a controller 150 may be hosted by a given LCom-enabled luminaire 100 and operatively coupled (e.g., via a communication bus/interconnect) with the one or more solid-state light sources 110 (1-N) of that LCom-enabled luminaire 100. In this example case, controller 150 may output a digital control signal to any one or more of the solid-state light sources 110 and may do so, for example, based on wired and/or wireless input received from a given local source (e.g., such as on-board memory 130) and/or remote source (e.g., such as a control interface or network 300). As a result, a given LCom-enabled luminaire 100 may be controlled in such a manner as to output any number of output beams (1-N), which may include light and/or LCom data (e.g., an LCom signal), as desired for a given target application or end-use. However, the present disclosure is not so limited.

For example, in some other embodiments, such as that illustrated in FIG. 2B, a controller 150 may be packaged or otherwise hosted, in part or in whole, by a given solid-state light source 110 of a given LCom-enabled luminaire 100 and operatively coupled (e.g., via a communication bus/interconnect) with the one or more solid-state light sources 110. If LCom-enabled luminaire 100 includes a plurality of such solid-state light sources 110 hosting their own controllers 150, then each such controller 150 may be considered, in a sense, a mini-controller, providing LCom-enabled luminaire 100 with a distributed controller 150. In some embodiments, controller 150 may be populated, for example, on one or more PCBs of the host solid-state light source 110. In this example case, controller 150 may output a digital control signal to an associated solid-state light source 110 of LCom-enabled luminaire 100 and may do so, for example, based on wired and/or wireless input received from a given local source (e.g., such as on-board memory 130) and/or remote source (e.g., such as a control interface, optional network 300, etc.). As a result, LCom-enabled luminaire 110 may be controlled in such a manner as to output any number of output beams (1-N), which may include light and/or LCom data (e.g., an LCom signal), as desired for a given target application or end-use.

In accordance with some embodiments, a given controller 150 may host one or more lighting control modules and can be programmed or otherwise configured to output one or more control signals, for example, to adjust the operation of the solid-state emitter(s) of a given solid-state light source 110 according to communicate luminaire position. For example, in some cases, a given controller 150 may be configured to output a control signal to control whether the light beam of a given solid-state emitter is on/off. In some instances, a given controller 150 may be configured to output a control signal to control the intensity/brightness (e.g., dimming; brightening) of the light emitted by a given solid-state emitter. In some cases, a given controller 150 may be configured to output a control signal to control the color (e.g., mixing; tuning) of the light emitted by a given solid-state emitter. Thus, if a given solid-state light source 110 includes two or more solid-state emitters configured to emit light having different wavelengths, the control signal may be used to adjust the relative brightness of the different solid-state emitters in order to change the mixed color output by that solid-state light source 110. In some embodiments, controller 150 may be configured to output a control signal to encoder 172 (discussed below) to facilitate encoding of LCom data for transmission by a given LCom-enabled luminaire 100. In some embodiments, controller 150 may be configured to output a control signal to modulator 174 (discussed below) to facilitate modulation of an LCom signal for transmission by a given LCom-enabled luminaire 100. Other suitable configurations and control signal output for a given controller 150 of a given LCom-enabled luminaire 100 will depend on a given application and will be apparent in light of this disclosure.

In accordance with some embodiments, a given LCom-enabled luminaire 100 may include an encoder 172. In some embodiments, encoder 172 may be configured, for example, to encode LCom data in preparation for transmission thereof by the host LCom-enabled luminaire 100. To that end, encoder 172 may be provided with any suitable configuration, as will be apparent in light of this disclosure.

In accordance with some embodiments, a given LCom-enabled luminaire 100 may include a modulator 174. In some embodiments, modulator 174 may be configured, for example, to modulate an LCom signal in preparation for transmission thereof by the host LCom-enabled luminaire 100. In some embodiments, modulator 174 may be a single-channel or multi-channel electronic driver (e.g., driver 120) configured, for example, for use in controlling the output of the one or more solid-state emitters of a given solid-state light source 110. In some embodiments, modulator 174 may be configured to control the on/off state, dimming level, color of emissions, correlated color temperature (CCT), and/or color saturation of a given solid-state emitter (or grouping of emitters). To such ends, modulator 174 may utilize any of a wide range of driving techniques, including, for example: (1) a pulse-width modulation (PWM) dimming protocol; (2) a current dimming protocol; (3) a triode for alternating current (TRIAC) dimming protocol; (4) a constant current reduction (CCR) dimming protocol; (5) a pulse-frequency modulation (PFM) dimming protocol; (6) a pulse-code modulation (PCM) dimming protocol; (7) a line voltage (mains) dimming protocol (e.g., dimmer is connected before input of modulator 174 to adjust AC voltage to modulator 174); and/or (8) any other suitable lighting control/driving technique, as will be apparent in light of this disclosure. Other suitable configurations and control/driving techniques for modulator 174 will depend on a given application and will be apparent in light of this disclosure.

In accordance with some embodiments, a given LCom-enabled luminaire 100 may include a multiplier 176. Multiplier 176 may be configured as typically done, and in some example embodiments may be configured to combine an input received from an upstream modulator 174 with an input received from an ambient light sensor 165 (discussed below). In some instances, multiplier 176 may be configured to increase and/or decrease the amplitude of a signal passing there through, as desired. Other suitable configurations for multiplier 176 will depend on a given application and will be apparent in light of this disclosure. In accordance with some embodiments, a given LCom-enabled luminaire 100 may include an adder 178. Adder 178 may be configured as typically done, and in some example embodiments may be configured to combine an input received from an upstream multiplier 178 with a DC level input. In some instances, adder 178 may be configured to increase and/or decrease the amplitude of a signal passing there through, as desired. Other suitable configurations for adder 178 will depend on a given application and will be apparent in light of this disclosure.

In accordance with some embodiments, a given LCom-enabled luminaire 100 may include a digital-to-analog converter (DAC) 180. DAC 180 may be configured as typically done, and in some example embodiments may be configured to convert a digital control signal into an analog control signal to be applied to a given solid-state light source 110 of the host LCom-enabled luminaire 100 to output an LCom signal therefrom. Note that DAC 180 may further be integrated into controller 150, in some embodiments. Other suitable configurations will be apparent in light of this disclosure.

In accordance with some embodiments, a given LCom-enabled luminaire 100 may include one or more sensors 160. In some embodiments, a given LCom-enabled luminaire 100 optionally may include an altimeter 161. When included, altimeter 161 may be configured as typically done, and in some example embodiments may be configured to aid in determining the altitude of a host LCom-enabled luminaire 100 with respect to a given fixed level (e.g., a floor, a wall, the ground, or other surface). In some embodiments, a given LCom-enabled luminaire 100 optionally may include a geomagnetic sensor 163. When included, geomagnetic sensor 163 may be configured as typically done, and in some example embodiments may be configured to determine the orientation and/or movement of a host LCom-enabled luminaire 100 relative to a geomagnetic pole (e.g., geomagnetic north) or other desired heading, which may be customized as desired for a given target application or end-use. In some embodiments, a given LCom-enabled luminaire 100 optionally may include an ambient light sensor 165. When included, ambient light sensor 165 may be configured as typically done, and in some example embodiments may be configured to detect and measure ambient light levels in the surrounding environment of the host LCom-enabled luminaire 100. In some cases, ambient light sensor 165 may be configured to output a signal, for example, to a multiplier 176 of LCom-enabled luminaire 100. In some embodiments, a given LCom-enabled luminaire 100 optionally may include a gyroscopic sensor 167. When included, gyroscopic sensor 167 may be configured as typically done, and in some example embodiments may be configured to determine the orientation (e.g., roll, pitch, and/or yaw) of the host LCom-enabled luminaire 100. In some embodiments, a given LCom-enabled luminaire 100 optionally may include an accelerometer 169. When included, accelerometer 169 may be configured as typically done, and in some example embodiments may be configured to detect motion of the host LCom-enabled luminaire 100. In any case, a given sensor 160 of a given host LCom-enabled luminaire 100 may include mechanical and/or solid-state componentry, as desired for a given target application or end-use. Also, it should be noted that the present disclosure is not so limited only to these example optional sensors 160, as additional and/or different sensors 160 may be provided as desired for a given target application or end-use, in accordance with some other embodiments, or no sensors 160 may be provided, as the case may be. Numerous configurations will be apparent in light of this disclosure.

In accordance with some embodiments, a given LCom-enabled luminaire 100 may include a communication module 170, which may be configured for wired (e.g., Universal Serial Bus or USB, Ethernet, FireWire, etc.) and/or wireless (e.g., Wi-Fi, Bluetooth, etc.) communication, as desired. In accordance with some embodiments, communication module 170 may be configured to communicate locally and/or remotely utilizing any of a wide range of wired and/or wireless communications protocols, including, for example: (1) a digital multiplexer (DMX) interface protocol; (2) a Wi-Fi protocol; (3) a Bluetooth protocol; (4) a digital addressable lighting interface (DALI) protocol; (5) a ZigBee protocol; and/or (6) a combination of any one or more thereof. It should be noted, however, that the present disclosure is not so limited to only these example communications protocols, as in a more general sense, and in accordance with some embodiments, any suitable communications protocol, wired and/or wireless, standard and/or custom/proprietary, may be utilized by communication module 170, as desired for a given target application or end-use. In some instances, communication module 170 may be configured to facilitate inter-luminaire communication between LCom-enabled luminaires 100. In addition or alternatively, communication module 170 may be configured so as to allow for receipt of information from network 300, such as luminaire position or estimated mobile computing device position information. As explained herein, the encoding scheme received from the mobile computing device 200 may be used by the luminaire 100 to determine a waveform for generating the VLC signals emitted by that luminaire 100 to communicate luminaire position to passing mobile computing devices 200. The communication module 170 may be configured to use any suitable wired and/or wireless transmission technologies (e.g., radio frequency, or RF, transmission; infrared, or IR, light modulation; etc.), as desired for a given target application or end-use. These transmission technologies may be implemented with a transceiver, for example a Bluetooth Low Energy (BLE) or ZigBee beacon, integrated with or connected to the communications module 170. Other suitable configurations for communication module 170 will depend on a given application and will be apparent in light of this disclosure.

Figure 3:
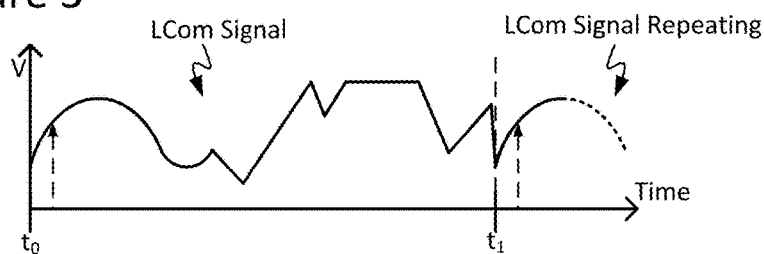
FIG. 3 illustrates an example arbitrary LCom signal as may be transmitted by an LCom-enabled luminaire, in accordance with an embodiment of the present disclosure.

As previously noted, a given LCom-enabled luminaire 100 may be configured, in accordance with some embodiments, to output light and/or light encoded with LCom data (e.g., an LCom signal). FIG. 3 illustrates an example arbitrary LCom signal as may be transmitted by an LCom-enabled luminaire 100, in accordance with an embodiment of the present disclosure. As can be seen here, LCom-enabled luminaire 100 may be configured to transmit a given LCom signal over a given time interval ($t_1$-$t_0$). In some cases, a given LCom-enabled luminaire 100 may be configured to repeatedly output its one or more LCom signals.

Figure 4:
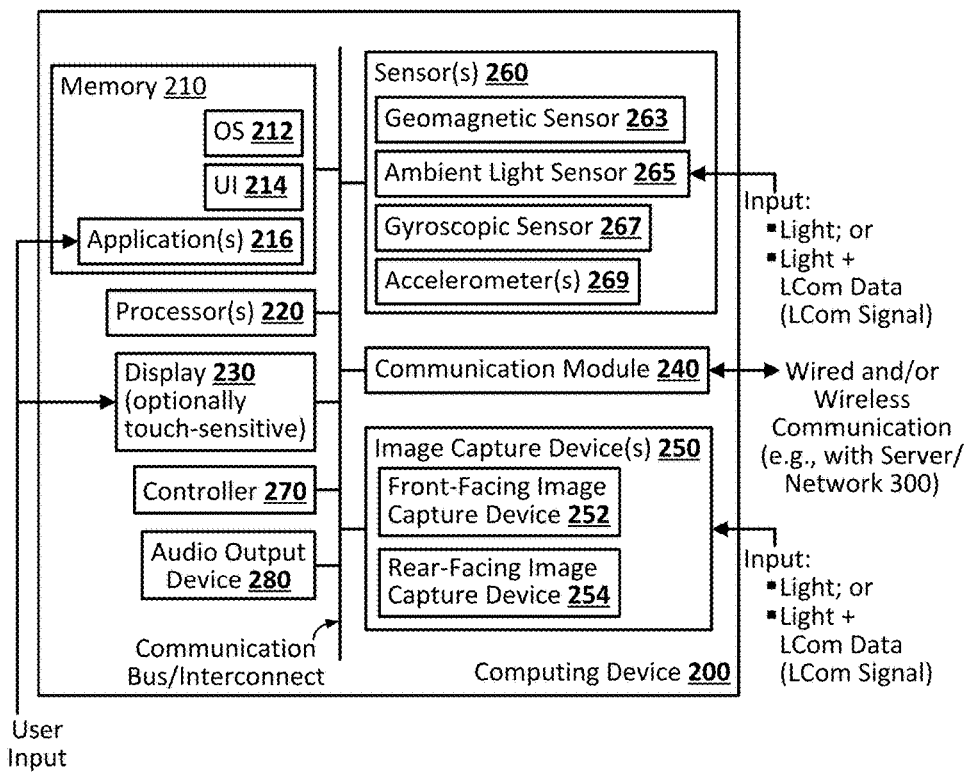
FIG. 4 illustrates an example mobile computing device configured in accordance with an embodiment of the present disclosure.

FIG. 4 illustrates an example mobile computing device 200 configured in accordance with an embodiment of the present disclosure. As discussed herein, mobile computing device 200 may be configured, in accordance with some embodiments: (1) to detect the light pulses of an LCom signal emitted by a transmitting LCom-enabled luminaire 100; and (2) to decode the LCom data from a detected LCom signal. To these ends, mobile computing device 200 can be any of a wide range of computing platforms, mobile or otherwise. For example, in accordance with some embodiments, mobile computing device 200 can be, in part or in whole: (1) a laptop/notebook computer or sub-notebook computer; (2) a tablet or phablet computer; (3) a mobile phone or smartphone; (4) a personal digital assistant (PDA); (5) a portable media player (PMP); (6) a cellular handset; (7) a handheld gaming device; (8) a gaming platform; (9) a desktop computer; (10) a television set; (11) a wearable or otherwise body-borne computing device, such as a smartwatch, smart glasses, or smart headgear; and/or (12) a combination of any one or more thereof. Other suitable configurations for mobile computing device 200 will depend on a given application and will be apparent in light of this disclosure.

As can be further seen from FIG. 4, mobile computing device 200 may include memory 210 and one or more processors 220. Memory 210 can be of any suitable type (e.g., RAM and/or ROM, or other suitable memory) and size, and in some cases may be implemented with volatile memory, non-volatile memory, or a combination thereof. A given processor 220 of mobile computing device 200 may be configured as typically done, and in some embodiments may be configured, for example, to perform operations associated with mobile computing device 200 and one or more of the modules thereof (e.g., within memory 210 or elsewhere). In some cases, memory 210 may be configured to be utilized, for example, for processor workspace (e.g., for one or more processors 220) and/or to store media, programs, applications, and/or content on mobile computing device 200 on a temporary or permanent basis. The one or more modules stored in memory 210 (e.g., such as operating system (OS) 212, user interface (UI) 214, and/or one or more applications 216) can be accessed and executed, for example, by the one or more processors 220 of mobile computing device 200. Just as explained with respect to memory 130 of the luminaires 100, memory 210 of the device 200 may include information that can be used to compute or otherwise calculate an estimated mobile computing device location, as will be appreciated in light of this disclosure.

Operating System (OS) 212 can be implemented with any suitable OS, mobile or otherwise, such as, for example: (1) Android OS from Google, Inc.; (2) iOS from Apple, Inc.; (3) BlackBerry OS from BlackBerry Ltd.; (4) Windows Phone OS from Microsoft Corp; (5) Palm OS/Garnet OS from Palm, Inc.; (6) an open source OS, such as Symbian OS; and/or (7) a combination of any one or more thereof. As will be appreciated in light of this disclosure, OS 212 may be configured, for example, to aid in processing LCom data during its flow through mobile computing device 200. Other suitable configurations and capabilities for OS 212 will depend on a given application and will be apparent in light of this disclosure. A user interface (UI) module 214 is provided as commonly done, and generally allows for user interaction with the device 200 (e.g., such as a graphical touched-based UI on various smartphones and tablets). Any number of user interface schemes can be used.

In accordance with some embodiments, memory 210 may have stored therein (or otherwise have access to) one or more applications 216. In some instances, mobile computing device 200 may be configured to receive input, for example, via one or more applications 216 stored in memory 210 (e.g., such as an indoor navigation application). In accordance with some embodiments, a given application 216 can be implemented in any suitable standard and/or custom/proprietary programming language, such as, for example: (1) C; (2) C++; (3) objective C; (4) JavaScript; and/or (5) any other suitable custom or proprietary instruction sets. In a more general sense, the applications 216 can be instructions encoded on any suitable non-transitory machine-readable medium that, when executed by one or more processors 220, carries out functionality of a given mobile computing device 200, in part or in whole. In one example embodiment, at least one of these applications 216 is a routine programmed or otherwise configured to provide decoding parameters of mobile computing device 200 to luminaire 100, so that luminaire 100 can determine an estimated location for the mobile computing device 200. The mobile computing device 200 may provide the estimated computing device location to the luminaire 100, either directly via the communications module 130 including a transceiver or indirectly via a network 300 and computer system 301. At least one application 216 may be further configured to receive LCom signals and decode those signals. In addition, at least one application 216 may be further configured to also monitor the luminaire for any changes (orientation, with respect to mobile computing device 200). Likewise, in some embodiments, the at least one application 216 may be further configured to optionally try to adjust its own settings to optimize decoding in effort to deal with situations where control by luminaire 100 is not available, for whatever reason.

As can be seen further from FIG. 4, mobile computing device 200 may include a display 230, in accordance with some embodiments. Display 230 can be any electronic visual display or other device configured to display or otherwise generate an image (e.g., image, video, text, and/or other displayable content) there at. In some instances, display 230 may be integrated, in part or in whole, with mobile computing device 200, whereas in some other instances, display 230 may be a stand-alone component configured to communicate with mobile computing device 200 using any suitable wired and/or wireless communications means. In some cases, display 230 optionally may be a touchscreen display or other touch-sensitive display. To that end, display 230 may utilize any of a wide range of touch-sensing techniques, such as, for example: (1) resistive touch-sensing; (2) capacitive touch-sensing; (3) surface acoustic wave (SAW) touch-sensing; (4) infrared (IR) touch-sensing; (5) optical imaging touch-sensing; and/or (6) a combination of any one or more thereof. In a more general sense, and in accordance with some embodiments, an optionally touch-sensitive display 230 generally may be configured to detect or otherwise sense direct and/or proximate contact from a user's finger, stylus, or other suitable implement at a given location of that display 230. In some cases, an optionally touch-sensitive display 230 may be configured to translate such contact into an electronic signal that can be processed by mobile computing device 200 (e.g., by the one or more processors 220 thereof) and manipulated or otherwise used to trigger a given UI action. In some cases, a touch-sensitive display 230 may facilitate user interaction with mobile computing device 200 via the UI 214 presented by such display 230. Numerous suitable configurations for display 230 will be apparent in light of this disclosure.

In accordance with some embodiments, mobile computing device 200 may include a communication module 240, which may be configured for wired (e.g., Universal Serial Bus or USB, Ethernet, FireWire, etc.) and/or wireless (e.g., Wi-Fi, Bluetooth, etc.) communication using any suitable wired and/or wireless transmission technologies (e.g., radio frequency, or RF, transmission; infrared, or IR, light modulation; etc.), as desired. In accordance with some embodiments, communication module 240 may be configured to communicate locally and/or remotely utilizing any of a wide range of wired and/or wireless communications protocols, including, for example: (1) a digital multiplexer (DMX) interface protocol; (2) a Wi-Fi protocol; (3) a Bluetooth protocol; (4) a digital addressable lighting interface (DALI) protocol; (5) a ZigBee protocol; (6) a near field communication (NFC) protocol; (7) a local area network (LAN)-based communication protocol; (8) a cellular-based communication protocol; (9) an Internet-based communication protocol; (10) a satellite-based communication protocol; and/or (11) a combination of any one or more thereof. It should be noted, however, that the present disclosure is not so limited to only these example communications protocols, as in a more general sense, and in accordance with some embodiments, any suitable communications protocol, wired and/or wireless, standard and/or custom/proprietary, may be utilized by communication module 240, as desired for a given target application or end-use. In some instances, communication module 240 may be configured to communicate with one or more LCom-enabled luminaires 100 via network 300. Numerous suitable configurations for communication module 240 will depend on a given application and will be apparent in light of this disclosure.

Also, as can be seen from FIG. 4, mobile computing device 200 may include one or more image capture devices 250, such as a front-facing image capture device 252 and/or a rear-facing image capture device 254, in accordance with some embodiments. For consistency and ease of understanding of the present disclosure, front-facing image capture device 252 and rear-facing image capture device 254 hereinafter may be collectively referred to generally as an image capture device 250, except where separately referenced. A given image capture device 250 can be any device configured to capture digital images, such as a still camera (e.g., a camera configured to capture still photographs) or a video camera (e.g., a camera configured to capture moving images including a plurality of frames). In some cases, a given image capture device 250 may include typical components such as, for instance, an optics assembly, an image sensor, and/or an image/video encoder, and may be integrated, in part or in whole, with mobile computing device 200. A given image capture device 250 can be configured to operate using light, for example, in the visible spectrum and/or other portions of the electromagnetic spectrum not limited to the infrared (IR) spectrum, ultraviolet (UV) spectrum, etc. In some instances, a given image capture device 250 may be configured to continuously acquire imaging data. As described herein, a given image capture device 250 of mobile computing device 200 may be configured, in accordance with some embodiments, to detect the light and/or LCom signal output of a transmitting LCom-enabled luminaire 100. In some instances, a given image capture device 250 may be, for example, a camera like one typically found in smartphones or other mobile computing devices. Numerous other suitable configurations for a given image capture device 250 (e.g., front-facing image capture device 252; rear-facing image capture device 254) of mobile computing device 200 will depend on a given application and will be apparent in light of this disclosure.

In accordance with some embodiments, mobile computing device 200 may include one or more sensors 260. In some embodiments, mobile computing device 200 optionally may include a geomagnetic sensor 263. When included, geomagnetic sensor 263 may be configured as typically done, and in some example embodiments may be configured to determine the orientation and/or movement of a host mobile computing device 200 relative to a geomagnetic pole (e.g., geomagnetic north) or other desired heading, which may be customized as desired for a given target application or end-use. In some embodiments, mobile computing device 200 optionally may include an ambient light sensor 265. When included, ambient light sensor 265 may be configured as typically done, and in some example embodiments may be configured to detect and measure ambient light levels in the surrounding environment of the host mobile computing device 200. In some embodiments, mobile computing device 200 optionally may include a gyroscopic sensor 267. When included, gyroscopic sensor 267 may be configured as typically done, and in some example embodiments may be configured to determine the orientation (e.g., roll, pitch, and/or yaw) of the host mobile computing device 200. In some embodiments, mobile computing device 200 optionally may include an accelerometer 269. When included, accelerometer 269 may be configured as typically done, and in some example embodiments may be configured to detect motion of the host mobile computing device 200. As a result of using these inertial sensors, the mobile computing device 200 may provide highly accurate position information. The accuracy of this position information may result in improved navigation system operation, because the luminaire position determined using the information from the multiple data points from the inertial sensors will likely be more accurate than a luminaire position calculated using a single data point. In any case, a given sensor 260 of a given host mobile computing device 200 may include mechanical and/or solid-state componentry, as desired for a given target application or end-use. Also, it should be noted that the present disclosure is not so limited only to these example optional sensors 260, as additional and/or different sensors 260 may be provided, as desired for a given target application or end-use, in accordance with some other embodiments. Numerous sensor configurations for device 200 will be apparent in light of this disclosure.

In accordance with some embodiments, mobile computing device 200 may include or otherwise be communicatively coupled with one or more controllers 270. A given controller 270 may be configured to output one or more control signals to control any one or more of the various components/modules of mobile computing device 200 and may do so, for example, based on wired and/or wireless input received from a given local source (e.g., such as on-board memory 210) and/or remote source (e.g., such as a control interface, optional network 300, etc.). In accordance with some embodiments, a given controller 270 may host one or more control modules and can be programmed or otherwise configured to output one or more control signals, for example, to adjust the operation of a given portion of mobile computing device 200. For example, in some cases, a given controller 270 may be configured to output a control signal to control operation of a given image capture device 250, and/or to output a control signal to control operation of one or more sensors 260. Numerous other configurations and control signal output for a given controller 270 of mobile computing device 200 will depend on a given application and will be apparent in light of this disclosure.

As can be seen further from FIG. 4, mobile computing device 200 may include an audio output device 280, in accordance with some embodiments. Audio output device 280 can be, for example, a speaker or any other device capable of producing sound from an audio data signal, in accordance with some embodiments. Audio output device 280 can be configured, for example, to reproduce sounds local to and/or received by its host mobile computing device 200. In some instances, audio output device 280 may be integrated, in part or in whole, with mobile computing device 200, whereas in some other instances, audio output device 280 may be a stand-alone component configured to communicate with mobile computing device 200 using any suitable wired and/or wireless communications means, as desired. Numerous other suitable types and configurations for audio output device 280 will depend on a given application and will be apparent in light of this disclosure.

Network 300 can be any suitable public and/or private communications network. For instance, in some cases, network 300 may be a private local area network (LAN) operatively coupled to a wide area network (WAN), such as the Internet. In some cases, network 300 may include one or more second-generation (2G), third-generation (3G), fourth-generation (4G), and/or fifth-generation (5G) mobile communication technologies. In some cases, network 300 may include a wireless local area network (WLAN) (e.g., Wi-Fi wireless data communication technologies). In some instances, network 300 may include Bluetooth wireless data communication technologies. In some cases, network 300 may include supporting infrastructure and/or functionalities, such as a server and a service provider (e.g., computer system 301), but such features are not necessary to carry out communication via network 300. In some instances, mobile computing device 200 may be configured for communicative coupling, for example, with a network 300 and one or more LCom-enabled luminaires 100. In some cases, mobile computing device 200 may be configured to receive data from network 300, for example, which serves to supplement LCom data received by mobile computing device 200 from a given LCom-enabled luminaire 100. In some instances, mobile computing device 200 may be configured to receive data (e.g., such as known reference position information, luminaire position, luminaire identifiers, and/or other data pertaining to a given LCom-enabled luminaire 100) from network 300 that facilitates navigation via one or more LCom-enabled luminaires 100. Numerous configurations for network 300 will be apparent in light of this disclosure.

Figure 5A:
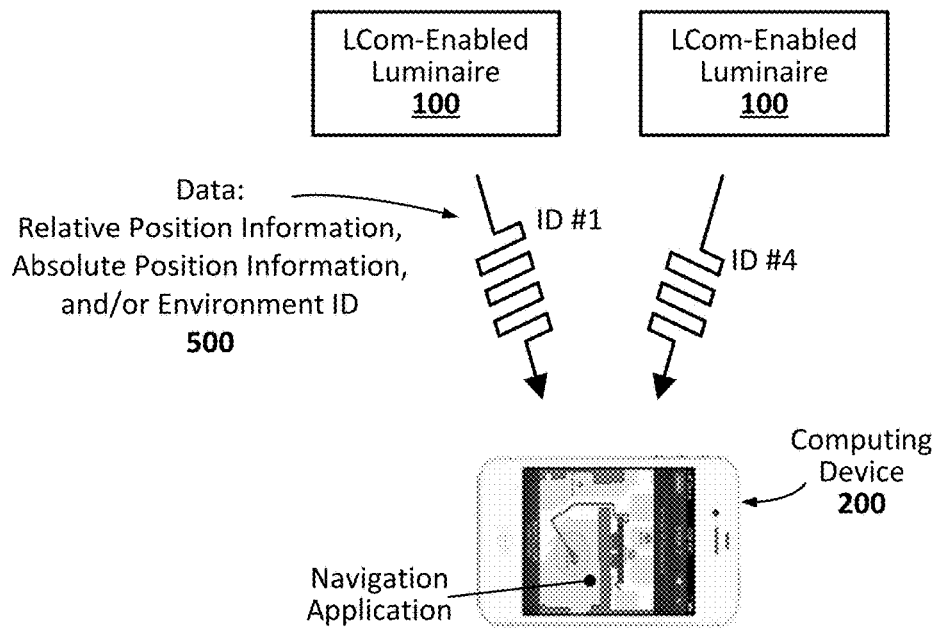
FIG. 5A illustrates an example LCom system, including an LCom-enabled luminaire and a mobile computing device, in accordance with an embodiment of the present disclosure.

FIG. 5A illustrates an example LCom system, including an LCom-enabled luminaire and a computing device, in accordance with an embodiment of the present disclosure. As can be seen, this example scenario includes two luminaires 100 each communicating with a mobile computing device 200, which happens to be a smartphone running an LCom-based navigation application. The navigation application can be, for instance, one of the applications 216 stored in memory 210 and executed by processor(s) 220. As can be further seen, the LCom signals being communicated include data 500, which generally includes position information, which may be used to navigate. For instance, if the user is receiving light from a specific luminaire 100 that has a known location, then the navigation application 'knows' where the user is and can continue to guide the user along the targeted path.

The position information 500 transmitted by the luminaires 100 may come in any number of forms. For instance, in some embodiments, the luminaire positions may be communicated as a relative position (e.g., relative to another luminaire 100, or some other object having a known position), and/or as an absolute position (e.g., x-y coordinates of a grid-based map or GPS coordinate). In still other embodiments, the luminaire position may be communicated as an environment ID, in which the transmitted ID translates to a specific location on a given map of the environment being navigated. In some such example cases, for instance, a luminaire might use dual tone multi frequency (DTMF) encoding, which means it continuously sends two unique frequencies.

Figure 5B:
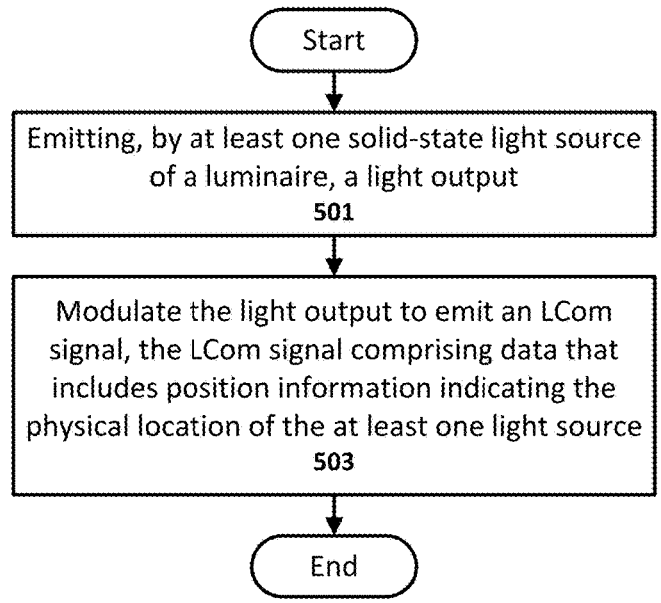
FIG. 5B illustrates an example method for emitting position information from an LCom-enabled luminaire, in accordance with an embodiment of the present disclosure.
Figure 5C:
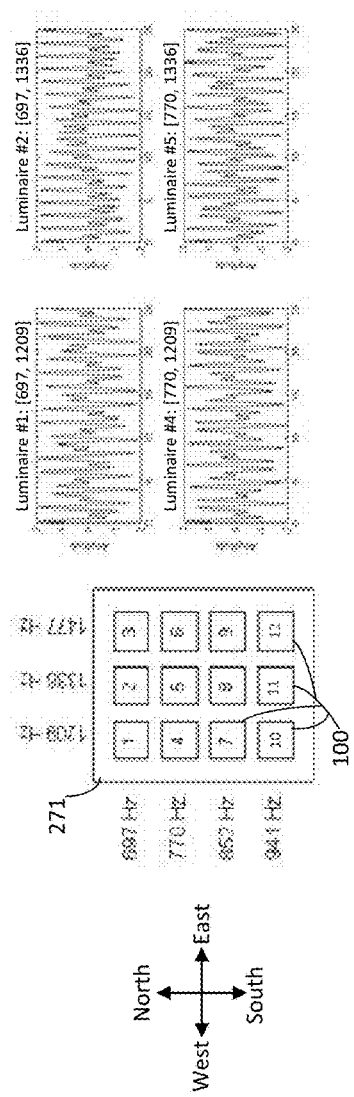
FIG. 5C illustrates an example graphical map of LCom-enabled luminaires deployed in a given venue, and corresponding LCom transmissions indicating the location of that particular luminaire within the venue, in accordance with an embodiment of the present disclosure.

FIG. 5C shows how an example DTMF-based ID system might work. As can be seen, a given environment 271 is the area being navigated and has a number of LCom-enabled luminaires 100. The environment 271 may be, for example, a super market or retail store, or a shopping mall, or a parking garage, or a large office space, to name a few examples. The environment 271 is effectively divided into a grid of physical locations, each location being associated with at least one luminaire 100. As can be further seen, each luminaire 100 is associated with two unique frequencies that it can transmit on a regular basis. The two unique frequencies can thus be used to correlate that particular luminaire's position to a specific location within the environment. For instance, if the user is receiving light from luminaire #1 (which transmits 697 Hz and 1209 Hz in this example embodiment), then the navigation application 'knows' that the user is in the North-West corner of the environment 271; similarly, if the user is receiving light from luminaire #12 (which transmits 941 Hz and 1477 Hz in this example embodiment), then the navigation application 'knows' that the user is in the South-East corner of the environment; and so on. So, in one example scenario, assuming that environment 271 is a store selling goods of some kind, each location can be associated with a specific product or range of products. Thus, a user can be led to a given product location by the navigation application, according to some embodiments. Note that the entire frequency-based grid can be scaled to higher or lower frequencies and still operate as described here to uniquely identify the location of individual luminaires 100.

FIG. 5B illustrates an example method for emitting position information from an LCom-enabled luminaire, in accordance with an embodiment of the present disclosure. As can be seen, the method includes emitting 501, by at least one solid-state light source of a luminaire, a light output. The method further includes modulating 503 the light output to emit an LCom signal, the LCom signal including data that includes position information indicating the physical location of the at least one light source. This position information may indicate that particular luminaire's location directly by virtue of relative or absolute position information, or indirectly by virtue of an environment ID that translates to a specific location on a given map of the environment being navigated, as previously explained. Numerous variations on using luminaires having known locations within a given area to be navigated will be apparent in light of this disclosure.

Figure 5D:
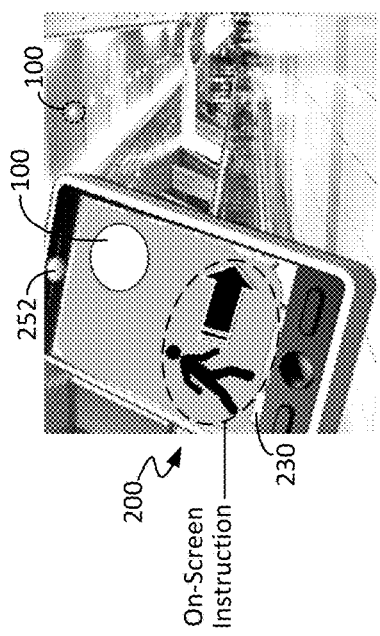
FIG. 5D illustrates an example scenario in which a computing device is configured to output instruction by way of visual feedback to a user, in accordance with an embodiment of the present disclosure.

FIG. 5D illustrates an example scenario in which a mobile computing device 200 receiving LCom signals from luminaries 100 and is configured to output a navigational instruction by way of visual feedback to a user, in accordance with an embodiment of the present disclosure. Note how the actual luminaire 100 in the physical space being navigated is being imaged by way of camera 252, and the resulting image of that luminaire 100 is provided on the display 230 of the device 200. Based on receiving LCom signals from that luminaire 100 (which indicate the position of that luminaire 100), the navigation application continues to guide the user with a visual cue (an arrow in this example case). As the user progresses down the passageway, each subsequent luminaire 100 that is similarly imaged and processed by the device 200 allows the navigational guidance to continue, until the user arrives at the luminaire associated with the user's intended destination.

Figure 6A:
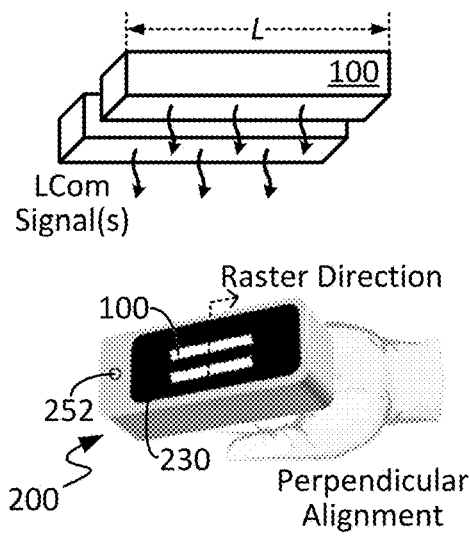
FIGS. 6A and 6B each illustrate example orientations between luminaires and a computing device, and how that affects the ability of the device raster lines to decode LCom messages from the luminaires.
Figure 6B:
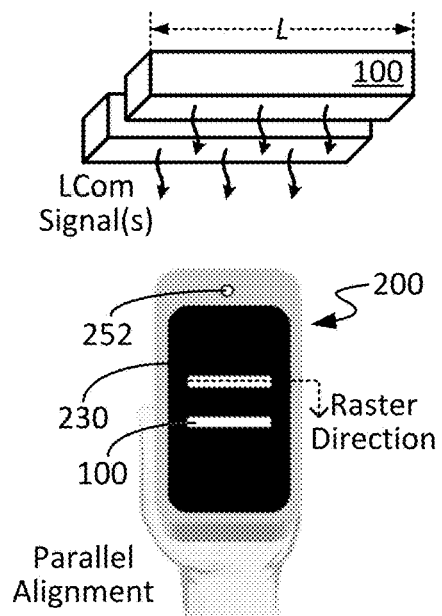

FIGS. 6A and 6B show a user holding the mobile computing device 200 in two different orientations. The mobile computing device 200 in this example is a smartphone, but can be any other suitable computing device as well. As can be seen, the device 200 includes a front-facing image capture device 252 that is currently imaging the above-luminaires 100, and the resulting image is shown on display 230. Two luminaires are being imaged, as can be further seen. In FIG. 6A, the user is holding the mobile computing device 200 where the luminaires 100 are perpendicular to the raster lines (and therefore parallel to the raster direction). For this case, the luminaires 100 being imaged spans the maximum number of raster lines. Assume, for example, camera frame having 750 raster lines perpendicular to the raster direction. Thus, a luminaire imaged with the device 200 in that orientation will span the maximum a relatively large number of raster lines (e.g., 350 raster lines or more). However, in the example of FIG. 6B, the luminaires 100 are parallel to the raster lines (and therefore perpendicular to the raster direction). Consequently, each imaged luminaire 100 effectively spans a fraction of the raster lines, or otherwise fewer raster lines relative to when the device 200 is in the opposite orientation shown in FIG. 6A. While in some cases the user can be directed to orient the device 100 to be more like the orientation shown in FIG. 6A (to improve the ability of device 200 to receive and process LCom messages from luminaires 100), other embodiments can solve this rastering problem through a variable baud rate which has the advantage of not requiring any effort or manual intervention with the user of the device 200.

Determining an Encoding Scheme of the Visible Light Communication (VLC) Signal

As mentioned above, some embodiments of the present disclosure facilitate previously installed luminaires to communicate with mobile computing devices by enabling identification of one or more VLC encoding schemes that can be received by passing mobile computing devices, regardless of the type of technology embodied in the mobile computing device. That is, despite changes in mobile computing platforms with respect to, for instance, computing power, camera frame rate, light detection sensors, communication protocol, and other hardware, firmware, or software features of a given mobile computing device, techniques of the present disclosure can be used to identify a VLC encoding scheme that can be used to generate a VLC signal recognizable by the mobile computing device. In some cases, this allows the useful life of previously installed luminaires to be extended, even throughout successive generations of mobile computing device technology developments. In some embodiments, LCom-enabled luminaires may be backwards compatible with earlier mobile computing devices and corresponding VLC encoding schemes so that luminaire functionality is not compromised even as luminaires are configured to communicate with the leading edge of mobile computing device technology as it progresses over time.

Figure 7:
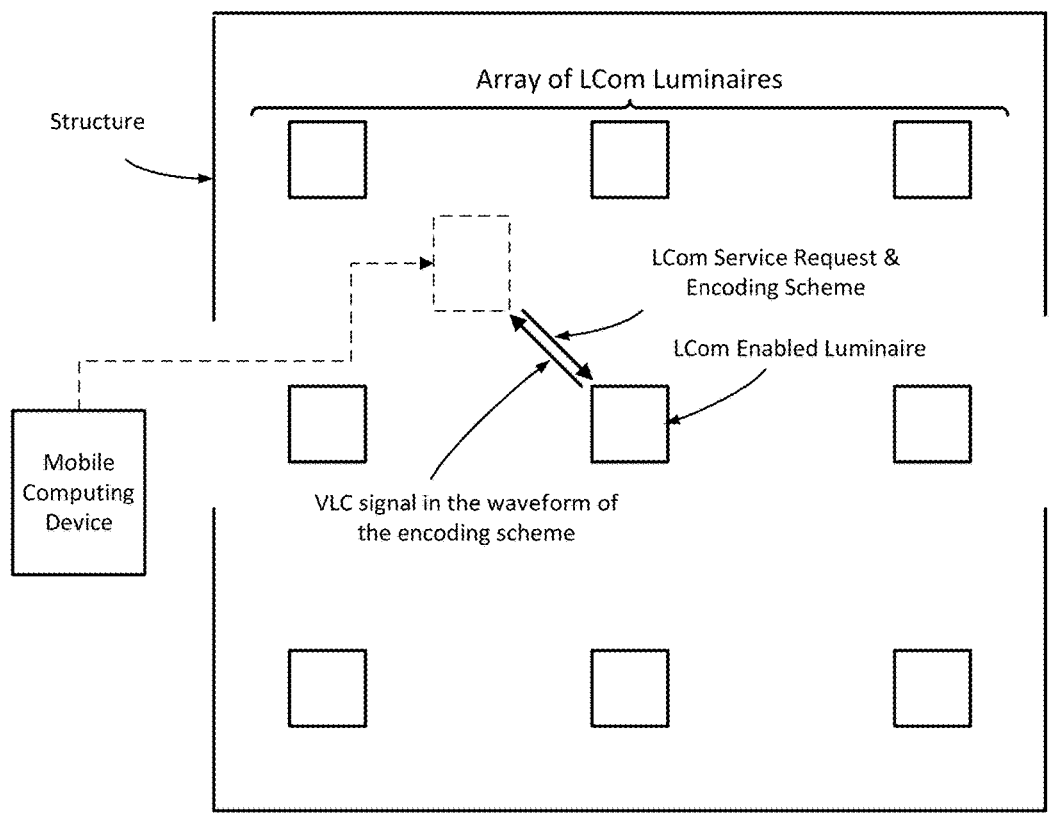
FIG. 7 is a block diagram illustrating a mobile computing device transmitting an LCom service request including an encoding scheme to a luminaire of the navigating system, in accordance with an embodiment of the present disclosure.

FIG. 7 is a high-level illustration of an example application of an embodiment of the present disclosure. As can be seen, a mobile computing device is depicted as moving into the structure by dotted lines. Upon entering the structure, the mobile computing device encounters an LCom-enabled luminaire, hereinafter referred to as simply a luminaire, which is capable of broadcasting luminaire position using VLC signals. To communicate with the luminaires of the array, the mobile computing device transmits an LCom service request to one of the luminaires in the array. In addition to identifying itself to the luminaire and requesting information (e.g., position information), the mobile computing device also identifies to the luminaire one or more VLC encoding schemes that are recognizable to the mobile computing device. Alternatively, the mobile computing device may identify to the luminaire its various light-receiving capabilities, such as its camera parameters (e.g., resolution and frame rate, and processor speed) or any other relevant light detector or processing parameters, so that the luminaire can in turn determine one or more VLC encoding schemes that will be recognizable to the mobile computing device. Once received, the luminaire uses the VLC encoding scheme hinted at or otherwise identified by the mobile computing device to generate and transmit VLC signals that can be received and decoded by the mobile computing device. In some cases, multiple mobile computing devices, some employing different encoding schemes, may be within the field of view of a single luminaire. In some such cases, the luminaire may time-division multiplex (i.e., alternate) between the different encoding schemes identified in the received service requests. In other cases, the luminaire may use an encoding scheme based on the number of requests identifying the same encoding scheme. Thus, the encoding scheme associated with the greatest number of service requests may be used first, and then the encoding scheme with the second highest number may be used next, and so on. In this way, even multiple mobile computing devices configured to receive VLC signals encoded with different VLC encoding schemes may all be in communication with a single luminaire at around the same time (although not necessarily at precisely the same time).

Figure 8:
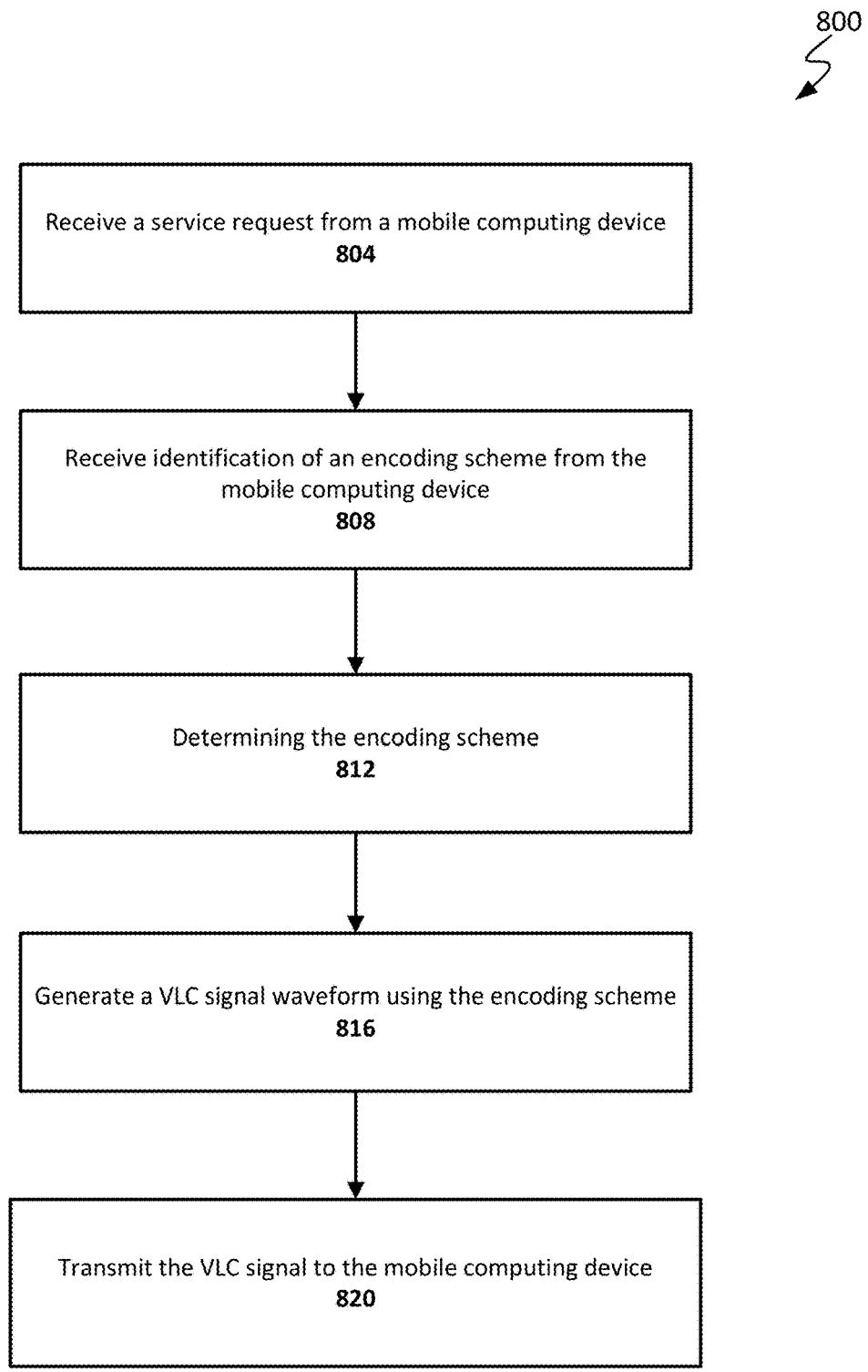
FIG. 8 is a flow chart illustrates an example method for identifying a visible-light communication encoding scheme, in accordance with an embodiment of the present disclosure.

FIG. 8 illustrates an example method 800 for determining a waveform for a VLC signal that can be recognized and/or processed by one or more mobile computing devices, according to an embodiment of the present disclosure. For ease of description, the example LCom system illustrated in FIG. 7 will be referred to in describing the method of FIG. 8. The method 800 may be performed by one or more LCom-enabled luminaires in an LCom system. As can be seen, the method 800 includes receiving a service request from a mobile computing device (e.g., computing device 200) in block 804, and receiving an identification of an encoding scheme from the mobile computing device in block 808. Note that in some embodiments, the service request may include the identification of the encoding scheme. In other embodiments, these may be separate communications. The service request (and encoding scheme information) may be received, for example, either directly from the mobile computing device or via a more indirect route. In this example embodiment, the service request is received by the luminaire directly from the mobile computing device via a local wired and/or wireless network, for example a Wi-Fi, Bluetooth or Zigbee network with which the mobile computing device is also in communication. Alternatively, the service request may be received by the luminaire indirectly via a remote server operatively coupled to a communication network with which the mobile computing device is also in communication, as will be discussed with reference to FIG. 11. In embodiments employing direct communication between the mobile computing device and the luminaire, the mobile computing device may be programmed or otherwise configured to determine the ID of the VLC encoding scheme (e.g., based on the known camera parameters) and to include that ID in the service request sent to the luminaire. In still other embodiments, the luminaire is programmed or otherwise configured to receive raw data included in the service request (or in the encoding scheme information) and to compute the ID of the VLC encoding scheme from that raw data. With the service request and encoding scheme information received, the luminaire can identify the desired VLC encoding scheme and commence broadcasting of luminaire position information to the mobile computing device using the desired VLC encoding scheme.

As described above, the encoding scheme can be generally characterized as a set of rules for encoding and generating a VLC signal so that the mobile computing device may recognize or process the VLC signal broadcast by the luminaire. In a more general sense, the encoding scheme provides waveform information and/or instructions for the luminaire to generate the desired VLC signal. As noted above, the identification of the encoding scheme can be provided in the service request itself, or in a subsequent communication between the mobile computing device and the luminaire. Regardless, in some embodiments the mobile computing device provides sufficient information to the luminaire such that the luminaire can identify the desired encoding scheme algorithm. One advantage of this embodiment is that the luminaire may adapt to, and transmit signals in, any VLC encoding scheme, whether or not it is previously known to the luminaire. In other cases, the mobile computing device may provide an instruction and address by which a look-up table describing the VLC encoding scheme is accessed. As a result, however, the mobile computing device may have to manage or maintain the VLC encoding scheme information using some of its storage space and processing power.

In one specific embodiment, the VLC encoding scheme is provided to the luminaire using an encoding scheme identifier. In this embodiment, the VLC encoding scheme identifier is transmitted by the mobile communication device and received by a receiver in communication with the luminaire. Once received, the VLC encoding scheme identifier is used by a processor, associated with the luminaire or a processor in communication with the luminaire, to identify and/or access the VLC encoding scheme rules and/or algorithm. The VLC encoding scheme rules and/or algorithm can be stored, for example, in the luminaire or equivalently stored in a non-transitory computer-readable medium by the luminaire via a wired or wireless network. The encoding scheme identifier can be any word, number, symbol or text string that the luminaire can use to determine an encoding scheme. The encoding scheme identifier may also be mobile computing device manufacturer information (e.g., model name and number or serial number), frequency information, timing features, or camera information (e.g., brand name, model number or serial number). In this example case, the encoding scheme identifier may be used to access an encoding scheme stored in the memory of the luminaire.

The method 800 continues with determining the encoding scheme in block 808. Using the received indication of the encoding scheme, the luminaire may identify a set of rules for encoding a quantity of data that is to be transmitted by the luminaire to the mobile computing device. In an example case, the luminaire may access a particular encoding scheme stored in its memory. In other cases, an encoding scheme identifier may be received and can be used with one or more look-up tables to identify the set of rules for encoding data that is to be transmitted to the mobile computing device. The encoding scheme may be stored in the memory of the luminaire. This information, however, may also be stored in other devices and be accessible via a network, such as in a cloud-based or otherwise remote storage facility. No matter how the encoding scheme is accessed, the luminaire may use the identified encoding scheme to generate a waveform for transmitting data via a VLC signal.

The method 800 further includes generating a VLC signal waveform using the encoding scheme in block 816. Using the accessed encoding scheme, the rules of the encoding scheme may be applied to data for generating a waveform that can be transmitted via the light signal. The encoding scheme may be any encoding scheme suitable for use with light-based communication systems, for example, NRZ, BiPhase, Manchester, or multi-frequency, to name a few examples. A variety of data may be encoded into the waveform using the encoding scheme, such as, luminaire position (to facilitate navigation) or advertising information (to encourage shoppers to enter a nearby store). This data may then be broadcast by the luminaire to the mobile computing device. With the VLC signal waveform generated according the rules of the encoding scheme, the luminaire may transmit VLC signals to the mobile computing device.

To this end, the method 800 further includes transmitting the VLC signal to the mobile computing device in block 820. With the waveform generated, the luminaire may transmit a VLC signal using one or more controllers to output a digital control signal to any one of the solid-state light sources of the luminaire. In response to receiving the control signal, the solid-state light sources generate and emit the VLC signals in the waveform that can be received and/or processed by the mobile computing device while in the field of view of the luminaire. Recall the VLC signals are generally not perceptible to the human eye, so as to allow the luminaires to also provide a basis illumination function, if so desired and assuming a white light luminaire.

Figure 9:
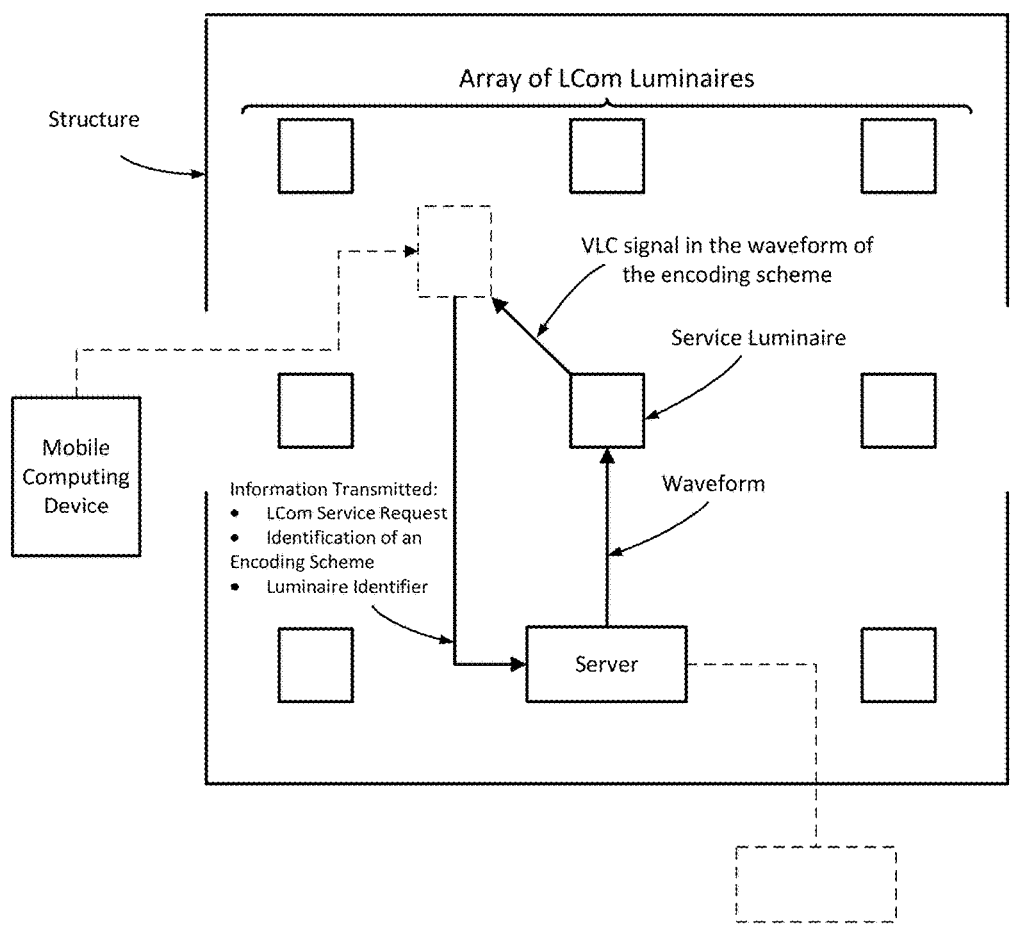
FIG. 9 is a block diagram illustrating an example embodiment of a mobile computing device transmitting an LCom service request to a server of the navigating system, in accordance with an embodiment of the present disclosure.

FIG. 9 is a high-level illustration of a navigation system including a server configured so that the mobile computing device may contact the server to establish communication with a luminaire of the array in a recognizable format, according to an embodiment. As can be seen, the server may be located within the structure housing array and thus be in communication with other devices of the navigation system (e.g., a mobile computing device or luminaire) using a local area network. In other embodiments, however, the server may be located outside the structure, as shown by the dotted lines. When the server is located remotely from the structure, the server may be connected to a wide area network, a local area network, or a combination thereof to facilitate the exchange of information between the server and other devices of the navigation system. In some cases, the mobile computing device provides to the server an identification of an encoding scheme and a luminaire identifier associated with the luminaire with which the device seeks service. In other embodiments, the mobile computing device provides to the server a luminaire identifier associated with the luminaire with which the device seeks service as well as raw data from which an identification of an encoding scheme can be computed. The raw data may be, for example, camera parameters of the mobile computing device or a make and model of the mobile computing device, or some other data from which the light detecting capability of the mobile computing device can be determined. Upon receiving the identification of the encoding scheme (or information allowing for determination of the identification of the encoding scheme) and luminaire identifier, the server determines the VLC signal waveform and identifies the service luminaire. The server transmits the waveform to the service luminaire via a wired and/or wireless network. In response to receiving the waveform, the service luminaire may broadcast its position via VLC signals.

Figure 10:
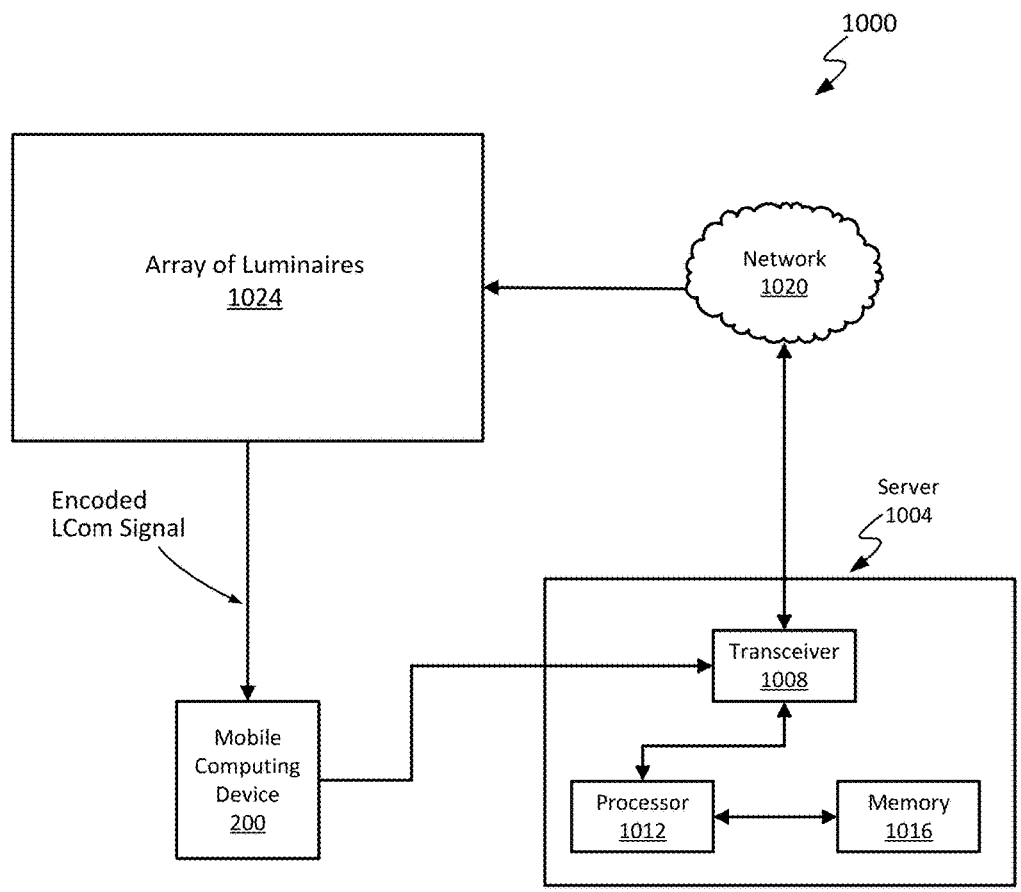
FIG. 10 is a block diagram illustrating the navigation system including a server configured in accordance with an embodiment of the present disclosure.

FIG. 10 illustrates a system 1000 in which a service luminaire is programmed based on an encoding scheme information from a passing mobile computing device that is processed by a server, according to an embodiment of the present disclosure. The navigation system 1000 includes a mobile computing device 200, a server 1004, network 1020, and an array 1024 of LCom enabled luminaires.

As can be seen, the server 1004 communicates with the mobile computing device 200 and the array 1024 via one or more communication networks 1020 (e.g., such as a wireless local area network operatively coupled to the Internet, or some other communication network that allows communication between the various components of system 1000; any standard communication network technologies can be used, as will be appreciated in light of this disclosure). In this example case, the server 1004 may be located remotely from the array of luminaires 1024. With the server 1004 located remotely, the communications network 1020 may include a wide area network, such as, the Internet. In other embodiments, however, the server 1004 may be located within or proximate to the array of luminaires 1024 as previously discussed in relation to FIG. 9. The server 1004 may be implemented with standard server technology, and generally includes a computer and a computer program executable thereon that manages access to a centralized resource or service in a network. The server 1004 may also provide files and services that are used by at least one of the luminaires of the array 1024 and mobile computing device 200.

Upon recognizing the presence of the navigation system, the mobile computing device 200 may be placed in communication (e.g., via the wireless network 1020) with the server 1004 to provide an identification of an encoding scheme and a luminaire identifier. The server 1004 may also contain the system intelligence and data for the array 1024 in one place. Having a central location for data may improve system management capabilities. Note that the network 1020 used by the mobile device 200 to communicate with server 1004 may be different than the network 1020 used by the array 1024 to communicate with server 1004, but they need not be. In one embodiment, network 1020 includes a local wireless network that is operatively connected to the Internet. In one such case, both the mobile device 200 and the array 1024 are both configured to communicatively couple with the local wireless network and can access the Internet accordingly. The server 1004 may transmit information to the network 1020 using a transceiver 1008.

The server 1004 may further include or otherwise be operatively coupled to a transceiver 1008 that is part of or otherwise in communication with server 1004. Transceiver 1008, for example, may be located in server 1004 or otherwise operatively coupled with the server 1004 and configured with standard technology to facilitate communication with one or more other transceivers located inside or outside the array 1024. In some embodiments, the transceiver 1008 is a modem, or other suitable circuitry that allows for transmitting and receiving data from a network. The communication signals may contain a variety of information, for example protocol information, data packets, navigational system access request and status information, encoding scheme, encoding scheme identifier, luminaire identifier, and luminaire position information. In an example case, the mobile computing device 200 may transmit an identification of an encoding scheme and a luminaire identifier to the server 1004. The server 1004 may receive this information via transceiver 1008 and network 1020. In the example embodiment shown, the transceiver 1008 may then communicate this information to one or more processors 1012, which in turn are programmed or otherwise configured to compile and distribute instructions and data to the operate luminaires within the array 1024.

For example, in some embodiments, the one or more processors 1012 are configured to process the indication of the encoding scheme and the luminaire identifier to provide waveform information to the service luminaire. In some cases, the encoding scheme may be determined by the processors 1012. The data created and/or managed by the processors 1012 may be stored within a memory 1016 to support various operations of the server 1004. Memory 1016 may be any physical device capable of non-transitory data storage. Regardless of whether information is stored in the memory 1016 of server 1004, the server 1004 may transmit VLC encoding information to one or more of the luminaires of the array 1024 via network 1020.

Figure 11:
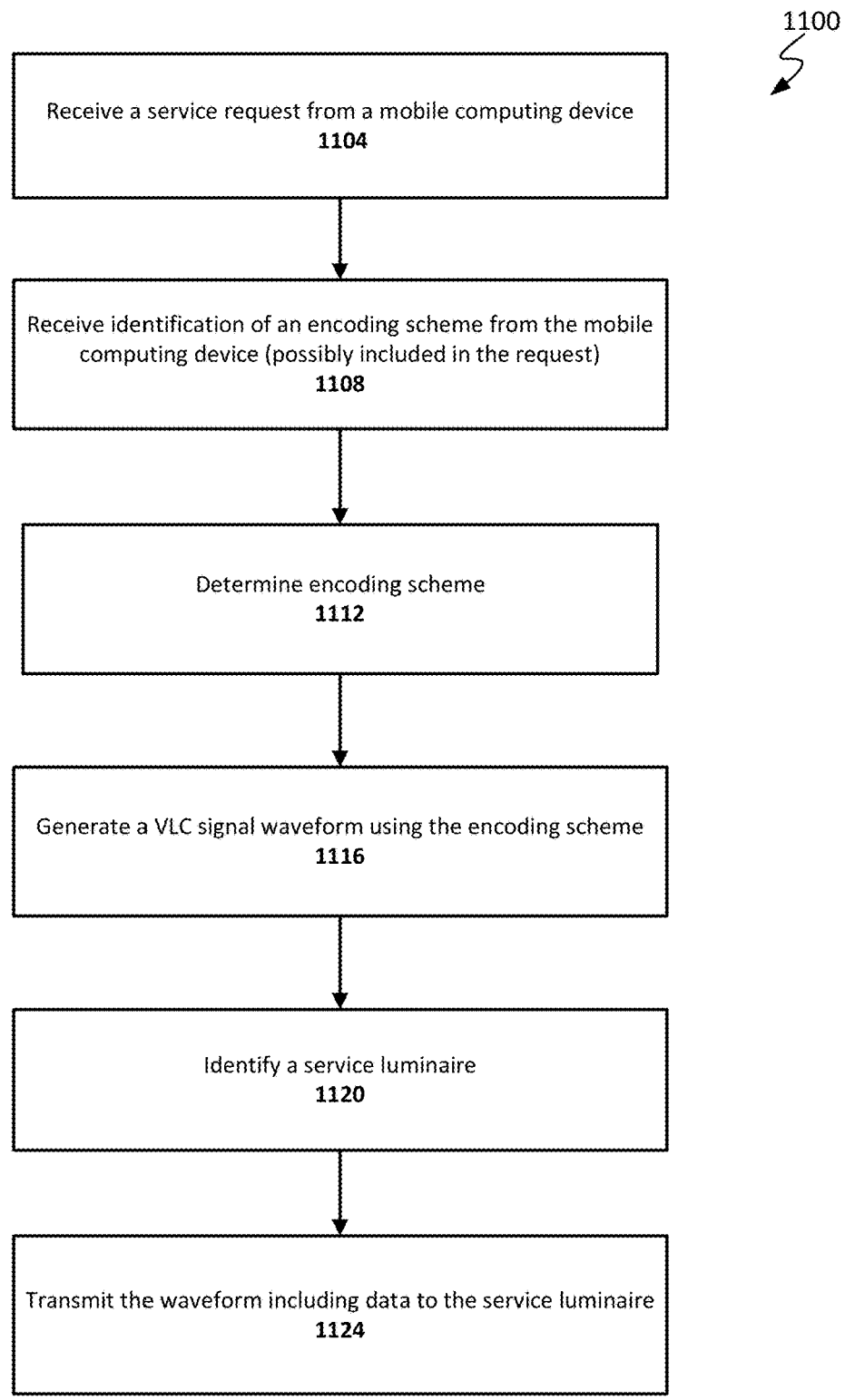
FIG. 11 is a flow chart illustrating another example method for identifying a visible-light communication encoding scheme, in accordance with an embodiment of the present disclosure.

FIG. 11 is a flow chart illustrating an example method 1100 for identifying a visible-light communication encoding scheme, in accordance with an embodiment of the present disclosure. The method 1100 may be performed by a navigation system that includes a server (e.g., the server 1004) and an array of luminaires (e.g., array 1024) in communication with a mobile computing device. As can be seen, the method 1100 includes receiving a service request from a mobile computing device in block 1104. Unlike the embodiment shown in FIG. 7 in which the service request is received directly by the luminaire, the service request in this example embodiment may be transmitted to a server from the mobile computing device using a wired and/or wireless network, such as a local Wi-Fi network operatively coupled to the Internet. With the service request received, the server and mobile computing device may be in communication with one another. Note that in embodiments including a server, the server may be programed or otherwise configured to process the service request before forwarding the request to the luminaire. For instance, the server may be configured to convert camera parameters provided by the mobile computing device into an ID of a VLC encoding scheme known to the luminaire. The server can then pass that ID to the luminaire, and the luminaire can execute a look-up function using a look-up table of VLC encoding schemes indexed by IDs. To this end, while FIG. 11 is intended to show functionality of server, other embodiments may be configured such that some of the depicted functionality is carried out by the mobile device, or the luminaire, or the server, or some combination of these components.

The method 1100 may continue with receiving an identification of an encoding scheme from the mobile computing device in block 1108. Note that this identification of an encoding scheme may be included in the service request received in block 1104. In an example case, the service request received by the server may include information from which an appropriate encoding scheme algorithm can be determined. The information may include, for instance, camera parameters or a mobile computing device make and model, as previously explained. In other cases, however, an encoding scheme identifier may be provided to the server. No matter how the encoding scheme is identified, the server may access the encoding scheme to generate a waveform for VLC signals.

The method 1100 continues with determining the encoding scheme in block 1112. Using the received identification of an encoding scheme, the server may compute or otherwise determine a particular encoding scheme algorithm. The determined algorithm can then be associated with a corresponding encoding scheme identifier, stored in server memory or otherwise accessible to the server. In other cases, the encoding scheme may be accessed using an encoding scheme identifier and one or more look-up tables. The look-up tables may be an index of the encoding schemes stored on the server. The encoding scheme identifier indicates which encoding scheme to use from the indexed encoding schemes. Once the encoding scheme has been identified, that scheme can be communicated to the luminaire by the server via the network.

The method 1100 further includes generating a VLC signal waveform using the encoding scheme in block 1116. Upon determining the encoding scheme, the server can apply the rules from the encoding scheme to data such that a waveform containing the data may be generated or otherwise computed. In an example case, the data may be luminaire position information. The waveform may be generated using any number of encoding schemes, for example, NRZ, BiPhase, Manchester, or multi-frequency. Further note that the waveform can be generated in digital format (in 1's and 0's stored in a data file), rather than an actual electrical signal.

The method 1100 may further include identifying a service luminaire in block 1120. The server may identify the service luminaire using any of several ways. One way, for example, the mobile computing device may provide its estimated location to the server. Using this location and other information stored on the server, such as look-up tables, luminaire geometry information, and/or building plans/maps, the server can determine the luminaire from which the mobile computing device is seeking service. Luminaire geometry information can be any information regarding luminaire shape and/or dimensions that can be used to identify a luminaire. In other cases, the mobile computing device may transmit marking information related to the position of the luminaire to the server, for example, in the service request. Marking information may be visual markings, such as, bar codes located on or near the luminaire. In response, the server may use this marking information along with other information stored on the server to identify the service luminaire. In some instances, the markings may also indicate an orientation of the luminaire with respect to a structure or coordinate system. The orientation of the luminaire may be combined with other information, such as luminaire geometry information and estimated mobile computing device position, to identify the service luminaire. No matter how the service luminaire is identified, the server may transmit the waveform (in a data file, for instance) to the service luminaire.

The method 1100 further continues with transmitting the waveform to the service luminaire in block 1124. With the service luminaire identified, the waveform may be transmitted to the service luminaire via one or more transceivers using a wired or wireless network. The waveform may be received and used by the service luminaire to generate a VLC signal. Upon entering the field of view of the service luminaire, the mobile computing device may receive and/or process the VLC signal.

Specific Applications

The navigation arrays may typically include luminaires manufactured by the same manufacturer because individual manufacturers employ particular encoding schemes, for example Manchester or multi-frequency encoding. Thus, if a luminaire is replaced due to an equipment failure or a new luminaire is added to the array, the replacement or new luminaire will likely be from the same manufacturer to maintain a consistent encoding scheme across all luminaires of the array. The descriptions and embodiments of this disclosure, however, provide techniques that enable a luminaire to be installed into a navigation array regardless of the luminaire manufacturer. As a result, luminaires may be installed into any navigation system because the luminaires can change their encoding schemes. No matter how the luminaires are manufactured and programmed, the luminaire may switch between encoding schemes to respond to multiple service requests from one or more mobile computing devices.

The luminaire or server may receive multiple service requests at one time. FIGS. 7 and 9 illustrate cases where a single mobile computing device enters the structure having the navigation system. The more likely case, however, may be that multiple mobile computing devices transmit service requests to the luminaire. These mobile computing devices, however, may recognize different encoding schemes. Thus, the luminaire may have to determine an order in which to respond to these requests, hereinafter referred to as a response order. For purposes of clarity the term luminaire will be used in describing the following processes and methods. These processes and methods, however, are also applicable to embodiments that include a server.

A luminaire may receive multiple service requests for a number of reasons, for example when two or more mobile computing devices are seeking service from the same luminaire. In other cases, a mobile computing device may transmit a second service request to renew a previous service request that has been previously received by a luminaire. This renewed service request may be transmitted for a number of reasons. Renewing a service request, for example, may occur when a mobile computing device does not receive a recognizable VLC signal within a period of time, such as, within three seconds after transmitting the service request. In other cases, the mobile computing device may renew a service request with a different encoding scheme because the mobile computing device is having difficulty recognizing the VLC signal in the waveform initially requested. This may occur if the mobile computing device has a default encoding scheme that does not provide optimum signal quality in all situations. No matter the reason for the luminaire receiving multiple service requests, the luminaire may determine how to respond to each service request in one of several ways.

One way for responding to multiple service requests may be to alternate between encoding schemes, for example by time-division multiplex. In this case the luminaire would generate and broadcast two or more VLC signals in an alternating fashion, for example, broadcast VLC signal "A" for five seconds, then broadcast VLC signal "B" for the next five seconds. The luminaire may repeat this process for a period of time, such that, the mobile computing devices receive its position. This method of responding to one or more service requests, however, does not consider when a service request is received, the distance of the mobile computing device to the luminaire, or whether any service requests identify the same encoding scheme. To address these concerns, the luminaire may respond to multiple service requests in a number of other ways. Another way of responding to multiple service requests, for example, may be to respond to service requests in the order that the service requests are received (i.e., first-in-first-out). In this case, the luminaire may log each service request when the request is received. Then using this information the luminaire can determine the first service request received by the luminaire and respond to that request first. Subsequent requests may be responded to by repeating the process to find the next most recently received service request. This approach may be easy to implement, but may not be the most efficient method for responding to the several mobile computing devices. As a result, the mobile computing devices may experience delays in receiving luminaire position and cause the luminaire to generate duplicate VLC signals when responding to subsequent service requests.

To avoid delays in responding to service requests and producing duplicate VLC signals, the luminaire may respond to multiple service requests at one time. In this case, the luminaire may first respond to the greatest number of service requests associated with the same encoding scheme. Then, the luminaire may respond to the service requests having the next most popular encoding scheme. This process may continue until all the service requests have been answered. The determination of the response order may occur once within a period of time, for example, every minute or every five minutes. In other cases, the response order may be continuously updated so that the luminaire may always generate VLC signals in the waveform associated with the encoding scheme having the highest number of service requests.

The response order, however, may also be determined based on the location of the mobile computing devices. Responding to the mobile computing devices nearest to the luminaire may be preferable because those mobile computing devices will be entering the field of view of the service luminaire sooner than other more remotely located devices. One method for determining the distance of mobile computing devices relative to the service luminaire may be using relative signal strength of communication signals received by the luminaire, for example, a service request. In this case, the service request having the strongest or highest relative signal strength is the mobile computing device nearest to the service luminaire. The determination of the nearest mobile computing device may be performed at periodic intervals, for example every minute or every five minutes. In other cases, the response order is continuously updated to determine the mobile computing device nearest to the service luminaire. Continuously updating the response order for a large number of service requests, however, may use a significant amount of system resources. To reduce this burden on the system, the response order may also be determined by comparing the signal strengths of service requests within a specified area or beam pattern of the luminaire, for example a ten foot radius around the field of view of the luminaire. As result, less system resources may be needed to develop the response order because there are likely fewer service requests from mobile computing devices within this defined perimeter. The luminaire may stop determining the response order once all service requests have been answered (i.e., there are no outstanding service requests).

In some embodiments, the response order may include service requests associated with a user's intended path of travel. In this case, the mobile computing device may anticipate the direction of travel of the user using onboard sensors. These onboard sensors may include inertial sensors, for example an accelerometer, for monitoring the movement of the mobile computing device. Based on its movement, the mobile computing device may transmit service requests to one or more luminaires along the user's intended path of travel, despite, the device not being in a position to receive VLC signals from each luminaire. The mobile computing device, in some cases, may also provide an estimated time of arrival to allow luminaires within the intended path of travel of the user to schedule when to broadcast VLC signals for the user's mobile computing device.

In some embodiments, the service requests may be used to track the location of a user of a mobile computing device within the structure of the navigation system. This application of the service request may be relevant when the navigation system is installed within a retail store or shopping mall, where knowledge of customer behavior represents a business value. Tracking the location of a user may also be applicable to environments where security and/or accountability of visitors, customers, employees or other personnel is a concern, such as hospital, government, and/or commercial buildings.

Numerous embodiments will be apparent in light of this disclosure. One example embodiment provides a method of identifying a visible-light communication encoding scheme, the method including receiving a service request from a mobile computing device, receiving an identification of an encoding scheme from the mobile computing device, and generating a visible-light communication waveform using the encoding scheme corresponding to the received identification. In some instances, each of receiving the service request, receiving the identification of the encoding scheme, and generating the visible-light communication waveform may be performed by an LCom-enabled luminaire capable of transmitting a visible-light communication signal based on the visible-light communication waveform. In some instances, each of receiving the service request, receiving the identification of the encoding scheme, and generating the visible-light communication waveform may be performed by a server configured to communicatively couple with an LCom-enabled luminaire capable of transmitting a visible-light communication signal based on the visible-light communication waveform. In some instances, the method further may further include transmitting the visible-light communication waveform from the server to the LCom-enabled luminaire. In some instances, the method may further include receiving a plurality of service requests from a corresponding plurality of mobile computing devices, receiving an identification of an encoding scheme from each of the plurality of mobile computing devices, in which each service request is associated with an encoding scheme and at least two of the identified encoding schemes are different from one another, and generating, for each of the plurality of service requests, a visible-light communication waveform using the encoding scheme corresponding to the received identification associated with the service request. In some instances, generating, for each of the plurality of service requests, a visible-light communication signal may be performed in order based on one of a time at which each of the plurality of service requests was received, a relative signal strength of each of the plurality of service requests, or a number of service requests associated with the same encoding scheme. In some instances, the service request and the identification of the encoding scheme may be received from the mobile computing device in the same communication. In some instances, the identification of the encoding scheme may be an encoding scheme identifier, and the method further includes selecting the encoding scheme from a table storing a plurality of encoding schemes based on the encoding scheme identifier. In some instances, the identification of the encoding scheme may include at least one of camera parameters of the mobile computing device and a make and model of the mobile computing device, and the method further includes determining the encoding scheme based on the at least one of camera parameters of the mobile computing device and a make and model of the mobile computing device. In some instances, the method may further include storing the encoding scheme in a table storing a plurality of encoding schemes, and associating the encoding scheme with the at least one of the camera parameters of the mobile computing device and the make and model of the mobile computing device.

Another example embodiment provides a non-transitory computer program product including a plurality of instructions non-transiently encoded thereon that, when executed by one or more processors, cause a process to be carried out. The computer program product may include one or more computer-readable mediums, such as, for example, a hard drive, compact disk, memory stick, server, cache memory, register memory, random-access memory (RAM), read-only memory (ROM), flash memory, or any suitable non-transitory memory that is encoded with instructions that can be executed by one or more processors, or a plurality or combination of such memories. The process includes receiving a service request from a mobile computing device, receiving an identification of an encoding scheme from the mobile computing device, and generating a visible-light communication waveform using the encoding scheme corresponding to the received identification. In some instances, the process may further include transmitting the visible-light communication waveform to an LCom-enabled luminaire capable of transmitting a visible-light communication signal based on the visible-light communication waveform.

Another example embodiment provides a system for identifying a visible-light communication encoding scheme, including an array of luminaires, in which each luminaire in the array of luminaires is a LCom-enabled luminaire capable of transmitting a visible light communication signal to a mobile computing device, and in which one or more luminaires in the array of luminaires are configured to receive a service request and an identification of an encoding scheme from the mobile computing device, and generate visible-light communication signals using the encoding scheme corresponding to the received identification. In some instances, the system may further include a server configured to receive the service request and the identification of the encoding scheme from the mobile computing device, generate a visible-light communication waveform using the encoding scheme, and provide the visible-light communication waveform to the one or more luminaires, in which the one or more luminaires are configured to generate visible-light communication signals based on the visible-light communication waveform. In some instances, the server may be further configured to receive a luminaire identifier from the mobile computing device and to identify a service luminaire from the array of luminaires using the luminaire identifier and one or more look-up tables. In some instances, the identification of the encoding scheme includes an encoding scheme identifier, and the one or more luminaires are further configured to select the encoding scheme from a table storing a plurality of encoding schemes based on the encoding scheme identifier. In some instances, the identification of the encoding scheme may include at least one of camera parameters of the mobile computing device and a make and model of the mobile computing device, and the one or more luminaires are further configured to determine the encoding scheme based on the at least one of camera parameters of the mobile computing device and a make and model of the mobile computing device. In some instances, the one or more luminaires may be further configured to store the encoding scheme in a table storing a plurality of encoding schemes, and associate the encoding scheme with the at least one of the camera parameters of the mobile computing device and the make and model of the mobile computing device. In some instances, the one or more luminaires in the array of luminaires may be further configured to receive a plurality of service requests from a corresponding plurality of mobile computing devices, receive an identification of an encoding scheme from each of the plurality of mobile computing devices, in which each service request is associated with an encoding scheme and at least two of the identified encoding schemes being different from one another, and generate, for each of the plurality of service requests, a visible-light communication signal using the encoding scheme corresponding to the received identification associated with the service request. In some instances, the one or more luminaires in the array of luminaires may be configured to generate for each of the plurality of service requests, a visible-light communication signal based on one of a time at which each of the plurality of service requests was received, a relative signal strength of each of the plurality of service requests, or a number of service requests associated with the same encoding scheme.

Further Considerations

The foregoing description of the embodiments of the disclosure has been presented for the purpose of illustration; it is not intended to be exhaustive or to limit the claims to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product including a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may include a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may include information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the present disclosure, which is set forth in the following claims.

What is claimed is:

1. A method for identifying a visible-light communication encoding scheme, comprising:
   receiving a service request from a mobile computing device;
   receiving an identification of an encoding scheme from the mobile computing device, wherein the identification of the encoding scheme comprises at least one of camera parameters of the mobile computing device and a make and model of the mobile computing device;
   determining the encoding scheme based on the at least one of camera parameters of the mobile computing device and a make and model of the mobile computing device; and
   generating a visible-light communication waveform using the encoding scheme corresponding to the received identification.

2. The method of claim 1, wherein each of receiving the service request, receiving the identification of the encoding scheme, determining the encoding scheme, and generating the visible-light communication waveform is performed by an LCom-enabled luminaire capable of transmitting a visible-light communication signal based on the visible-light communication waveform.

3. The method of claim 1, wherein each of receiving the service request, receiving the identification of the encoding scheme, determining the encoding scheme, and generating the visible-light communication waveform is performed by a server configured to communicatively couple with an LCom-enabled luminaire capable of transmitting a visible-light communication signal based on the visible-light communication waveform.

4. The method of claim 3, the method further comprising transmitting the visible-light communication waveform from the server to the LCom-enabled luminaire.

5. The method of claim 1, the method further comprising:
   receiving a plurality of service requests from a corresponding plurality of mobile computing devices;
   receiving an identification of an encoding scheme from each of the plurality of mobile computing devices, wherein each service request is associated with an encoding scheme and at least two of the identified encoding schemes are different from one another; and
   generating, for each of the plurality of service requests, a visible-light communication waveform using the encoding scheme corresponding to the received identification associated with the service request.

6. The method of claim 5, wherein generating, for each of the plurality of service requests, a visible-light communication signal is performed in order based on one of:
   a time at which each of the plurality of service requests was received;
   a relative signal strength of each of the plurality of service requests; or
   a number of service requests associated with the same encoding scheme.

7. The method of claim 1, wherein the service request and the identification of the encoding scheme are received from the mobile computing device in the same communication.

8. The method of claim 1, wherein the identification of the encoding scheme further comprises an encoding scheme identifier, and wherein determining the encoding scheme further comprises:
   selecting the encoding scheme from a table storing a plurality of encoding schemes based on the encoding scheme identifier.

9. The method of claim 1, the method further comprising:
   storing the encoding scheme in a table storing a plurality of encoding schemes; and
   associating the encoding scheme with the at least one of the camera parameters of the mobile computing device and the make and model of the mobile computing device.

10. A non-transitory computer program product comprising a plurality of instructions encoded thereon that when executed by one or more processors cause a process to be carried out, the process comprising:
    receiving a service request from a mobile computing device;
    receiving an identification of an encoding scheme from the mobile computing device, wherein the identification of the encoding scheme comprises at least one of camera parameters of the mobile computing device and a make and model of the mobile computing device;
    determining the encoding scheme based on the at least one of camera parameters of the mobile computing device and a make and model of the mobile computing device; and
    generating a visible-light communication waveform using the encoding scheme corresponding to the received identification.

11. The computer program product of claim 10, the process further comprising transmitting the visible-light communication waveform to an LCom-enabled luminaire capable of transmitting a visible-light communication signal based on the visible-light communication waveform.

12. A system for identifying a visible-light communication encoding scheme, the system comprising:
    an array of luminaires, wherein each luminaire in the array of luminaires is a LCom-enabled luminaire capable of transmitting a visible light communication signal to a mobile computing device, and wherein one or more luminaires in the array of luminaires are configured to:
       receive a service request and an identification of an encoding scheme from the mobile computing device, wherein the identification of the encoding scheme comprises at least one of camera parameters of the mobile computing device and a make and model of the mobile computing device; and
       generate visible-light communication signals using the encoding scheme corresponding to the received identification, wherein the encoding scheme is based on the at least one of camera parameters of the mobile computing device and a make and model of the mobile computing device.

13. The system of claim 12, further comprising a server configured to:
    receive the service request and the identification of the encoding scheme from the mobile computing device;
    determine the encoding scheme based on the at least one of camera parameters of the mobile computing device and a make and model of the mobile computing device;

generate a visible-light communication waveform using the encoding scheme; and provide the visible-light communication waveform to the one or more luminaires, wherein the one or more luminaires are configured to generate visible-light communication signals based on the visible-light communication waveform.

14. The system of claim 13, wherein the server is further configured to receive a luminaire identifier from the mobile computing device and to identify a service luminaire from the array of luminaires using the luminaire identifier and one or more look-up tables.

15. The system of claim 12, wherein the identification of the encoding scheme further comprises an encoding scheme identifier, and wherein the one or more luminaires are further configured to:

select the encoding scheme from a table storing a plurality of encoding schemes based on the encoding scheme identifier.

16. The system of claim 12, wherein the one or more luminaires are further configured to:

determine the encoding scheme based on the at least one of camera parameters of the mobile computing device and a make and model of the mobile computing device.

17. The system of claim 16, wherein the one or more luminaires are further configured to:

store the encoding scheme in a table storing a plurality of encoding schemes; and associate the encoding scheme with the at least one of the camera parameters of the mobile computing device and the make and model of the mobile computing device.

18. The system of claim 12, wherein the one or more luminaires in the array of luminaires are further configured to:

receive a plurality of service requests from a corresponding plurality of mobile computing devices;

receive an identification of an encoding scheme from each of the plurality of mobile computing devices, wherein each service request is associated with an encoding scheme and at least two of the identified encoding schemes being different from one another; and generate, for each of the plurality of service requests, a visible-light communication signal using the encoding scheme corresponding to the received identification associated with the service request.

19. The system of claim 18, wherein the one or more luminaires in the array of luminaires are configured to generate for each of the plurality of service requests, a visible-light communication signal based on one of:

a time at which each of the plurality of service requests was received;

a relative signal strength of each of the plurality of service requests; or a number of service requests associated with the same encoding scheme.

* * * * *